(12) United States Patent
Whittington et al.

(10) Patent No.: US 11,746,312 B1
(45) Date of Patent: Sep. 5, 2023

(54) STILLAGE CLARIFICATION

(71) Applicants: Separator Technology Solutions US Inc., San Leandro, CA (US); Scott Kohl, Maize, KS (US)

(72) Inventors: Ashley Whittington, San Francisco, CA (US); Scott Kohl, Maize, KS (US)

( * ) Notice: Subject to any disclaimer, the term of this patent is extended or adjusted under 35 U.S.C. 154(b) by 197 days.

(21) Appl. No.: 16/888,617

(22) Filed: May 29, 2020

Related U.S. Application Data

(60) Provisional application No. 62/855,479, filed on May 31, 2019.

(51) Int. Cl.
   *C12F 3/10* (2006.01)
   *B01D 21/26* (2006.01)
   (Continued)

(52) U.S. Cl.
   CPC ............. *C12F 3/10* (2013.01); *B01D 21/262* (2013.01); *B01D 21/267* (2013.01); *B01J 8/007* (2013.01);
   (Continued)

(58) Field of Classification Search
   CPC ..... C12F 3/10; B04B 1/20; B04B 1/04; B04B 5/10; B04B 7/12; B04B 2001/2041; A23K 20/147; A23K 10/38; A23K 10/37; B01D 21/262; B01D 21/267; B01D 36/045; B01D 17/00; B01D 17/02; B01D 17/0208; B01D 17/0217; B01D 7/00; B01D 7/02; B01D 7/04; B01D 21/26; B01D 29/62; B01D 29/66; B01D 29/68; B01D 29/682; B01D 29/684; B01D 29/78; B01D 36/00; B01D 36/003; B01D 37/00; B01D 2221/06; A23J 1/001; A23J 1/005; A23J 1/006; A23J 1/16; B04C 3/04; B04C 5/24; B04C 5/26; B04C 5/28; B04C 7/00; B04C 9/00; B04C 11/00; B04C 2009/002; C02F 1/38; C02F 1/385; C02F 9/00; C11B 3/001; C11B 3/008;
   (Continued)

(56) References Cited

U.S. PATENT DOCUMENTS 2,765,918 A * 10/1956 Fontein ..................... B04C 5/28
                                                                      55/346
2,840,524 A *  6/1958 Fitch ......................... B64C 1/34
                                                                      209/729
(Continued)

FOREIGN PATENT DOCUMENTS

WO    2018232540 A1    12/2018
WO    2018236919 A2    12/2018
(Continued)

*Primary Examiner* — Joseph W Drodge
(74) *Attorney, Agent, or Firm* — Marcus N. DiBuduo; John R. Aaron

(57) ABSTRACT

A stillage clarification process and related system include using hydrocyclones and high recovery disc centrifuges for fractionation of stillage from a grain ethanol plant and splitting the stillage into fractions with mass and compositional assays per bushel of grain processed. The fractions include a first fraction comprising 45% to 70% protein and 3% to 8% fat, a second fraction comprising distillers corn oil, a third fraction comprising a fiber having made up of approximately 22% to 28% protein and less than 8% fat, and a fourth fraction comprising at least 30% soluble protein and less than 3% fat.

9 Claims, 19 Drawing Sheets

(51) Int. Cl.
  *B01J 8/00* (2006.01)
  *B04B 5/10* (2006.01)
(52) U.S. Cl.
  CPC ............... *B01J 8/0055* (2013.01); *B04B 5/10* (2013.01); *B01D 2201/06* (2013.01)
(58) Field of Classification Search
  CPC ...... C11B 3/16; C12P 7/06; C12P 7/08; C12P 7/10; C13K 1/02; C13K 1/04; C12M 47/10; C12M 47/12; B01J 8/007; B01J 8/0055
  USPC .......... 210/258, 411, 413, 512.1, 512.2, 770, 210/787, 788, 791, 806; 209/12.1, 711, 209/715, 719, 727, 728; 127/24, 25, 55, 127/56; 554/175, 177
  See application file for complete search history.

(56) References Cited

U.S. PATENT DOCUMENTS

| | | | | |
|---|---|---|---|---|
| 2,965,522 A * | 12/1960 | Crespin | ............... | B04C 5/26 209/729 |
| 3,251,717 A * | 5/1966 | Honeychurch | ....... | C08B 30/044 127/65 |
| 4,283,232 A * | 8/1981 | Best | ............... | C08B 30/00 209/729 |
| 4,389,307 A * | 6/1983 | Boadway | ............... | B04C 5/28 209/733 |
| 5,482,634 A * | 1/1996 | Goerlach-Doht | ....... | C08B 11/20 210/651 |
| 7,601,858 B2 * | 10/2009 | Cantrell | ............... | C11B 3/001 554/8 |
| 8,309,711 B2 * | 11/2012 | Wiley | ............... | B01D 29/114 210/411 |
| 8,633,003 B2 | 1/2014 | Brotherson | | |
| 8,652,818 B2 * | 2/2014 | Lawton, Jr. | ............... | C12P 7/06 435/813 |
| 8,679,353 B2 * | 3/2014 | Winsness | ............... | B01D 21/009 210/770 |
| 8,778,433 B2 * | 7/2014 | Lee | ............... | C12F 3/10 422/255 |
| 8,813,973 B2 * | 8/2014 | Lee | ............... | B01D 25/28 210/402 |
| 8,986,551 B2 * | 3/2015 | Kohl | ............... | C11B 3/08 44/302 |
| 9,012,191 B2 * | 4/2015 | Lee | ............... | C12P 19/14 435/161 |
| 9,029,126 B2 * | 5/2015 | Bleyer | ............... | C02F 1/52 435/71.1 |
| 9,328,311 B2 * | 5/2016 | Jenkins | ............... | C11B 1/10 |
| 9,376,504 B2 * | 6/2016 | Dieker | ............... | C12P 19/02 |
| 9,394,505 B2 | 7/2016 | Sticklen et al. | | |
| 9,695,381 B2 | 7/2017 | Lee | | |
| 9,714,267 B2 * | 7/2017 | Emanuele | ............... | C07K 1/14 |
| 9,718,006 B2 * | 8/2017 | Lee | ............... | B01D 29/23 |
| 9,730,463 B1 * | 8/2017 | Roa-Espinosa | ............... | C11B 1/06 |
| 9,732,302 B2 | 8/2017 | Lee | | |
| 9,821,257 B2 | 11/2017 | Arefjord | | |
| 9,896,643 B2 * | 2/2018 | Redford | ............... | C11B 13/00 |
| 10,058,120 B2 | 8/2018 | Herbst | | |
| 10,059,966 B2 * | 8/2018 | Bootsma | ............... | C12P 7/14 |
| 10,190,076 B2 * | 1/2019 | Lee | ............... | B04B 5/10 |
| 10,233,404 B2 * | 3/2019 | Lee | ............... | C11B 13/00 |
| 10,260,031 B2 * | 4/2019 | Gallop | ............... | B01D 33/11 |
| 10,266,790 B2 * | 4/2019 | Lee | ............... | A23L 7/198 |
| 10,443,017 B1 * | 10/2019 | Bleyer | ............... | B01D 21/267 |
| 10,465,152 B2 | 11/2019 | Bootsma | | |
| 10,519,398 B1 * | 12/2019 | Lee | ............... | A23K 50/75 |
| 11,015,156 B1 * | 5/2021 | Kohl | ............... | A23K 50/75 |
| 2003/0180415 A1 * | 9/2003 | Stiefel | ............... | A23K 10/30 426/18 |
| 2007/0184541 A1 * | 8/2007 | Karl | ............... | C12P 19/02 435/161 |
| 2008/0277264 A1 * | 11/2008 | Sprague | ............... | C12M 21/12 204/157.9 |
| 2012/0244590 A1 * | 9/2012 | Lee | ............... | C12M 21/12 435/289.1 |
| 2013/0143290 A1 * | 6/2013 | Narendranath | ........ | C12M 21/12 435/165 |
| 2013/0288376 A1 * | 10/2013 | Lee | ............... | C11B 13/00 435/410 |
| 2014/0106419 A1 * | 4/2014 | Bazzana | ............... | C12P 7/16 435/157 |
| 2014/0343259 A1 * | 11/2014 | Bleyer | ............... | C07K 1/145 530/414 |
| 2015/0191750 A1 * | 7/2015 | Bleyer | ............... | C12P 7/06 435/71.1 |
| 2015/0211026 A1 * | 7/2015 | Bazzana | ............... | C12P 7/10 435/141 |
| 2015/0231535 A1 * | 8/2015 | Lee | ............... | B01D 29/6476 210/457 |
| 2015/0267225 A1 * | 9/2015 | Bazzana | ............... | C12M 45/09 435/157 |
| 2015/0305370 A1 * | 10/2015 | Bleyer | ............... | A23K 10/38 426/489 |
| 2016/0152931 A1 | 6/2016 | Bootsma | | |
| 2017/0114293 A1 | 4/2017 | Jakel et al. | | |
| 2017/0166835 A1 * | 6/2017 | Jakel | ............... | C11B 1/10 |
| 2017/0226165 A1 | 8/2017 | Franko et al. | | |
| 2017/0268024 A1 * | 9/2017 | Bootsma | ............... | C12Y 302/01001 |
| 2018/0044620 A1 * | 2/2018 | Bootsma | ............... | B01D 39/083 |
| 2018/0346831 A1 * | 12/2018 | Sutterlin | ............... | C11C 3/003 |
| 2019/0017080 A1 * | 1/2019 | Bootsma | ............... | C12M 47/10 |
| 2019/0119711 A1 * | 4/2019 | Lee | ............... | A23K 10/38 |
| 2019/0160470 A1 * | 5/2019 | Hora | ............... | C13K 1/02 |
| 2019/0241834 A1 * | 8/2019 | Lee | ............... | A23K 10/38 |
| 2019/0264148 A1 * | 8/2019 | Gallop | ............... | C12P 7/06 |
| 2019/0376002 A1 * | 12/2019 | Urban | ............... | C11B 1/16 |
| 2020/0113207 A1 * | 4/2020 | Gallop | ............... | B01D 21/267 |

FOREIGN PATENT DOCUMENTS

| | | |
|---|---|---|
| WO | 2018236919 A3 | 12/2018 |
| WO | 2018237238 A1 | 12/2018 |

* cited by examiner

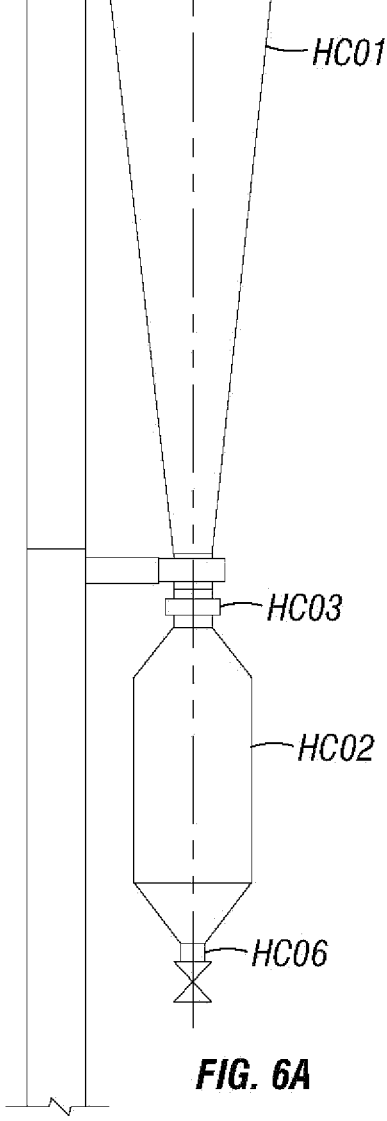
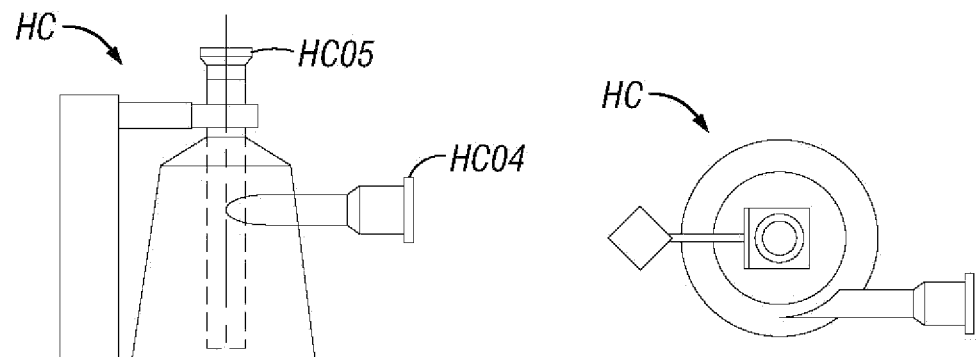
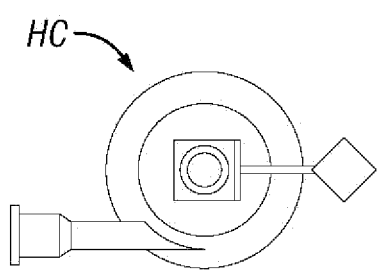
FIG. 6A
FIG. 6B
FIG. 6C

STILLAGE CLARIFICATION

CROSS-REFERENCE TO RELATED APPLICATIONS

This application claims priority to, and the benefit of, U.S. Provisional Patent Application No. 62/855,479, filed on May 31, 2019, which may be hereby incorporated by reference in its entirety.

FIELD OF THE INVENTION

The present invention relates generally to processes and systems for producing grain alcohols, such as ethanol, and, more particularly, to improved methods and systems for efficiently processing, recovering, and recycling the by-products and co-products generated during the grain alcohol production process.

BACKGROUND OF THE INVENTION

The background description provided herein is for the purpose of generally presenting the context of the present disclosure. Work of the presently named inventors, to the extent the work is described in the present disclosure, as well as aspects of the description that may not otherwise qualify as prior art at the time of filing, are neither expressly nor impliedly admitted as prior art.

Ethanol is used as a fuel additive and the volume demand for such an additive has resulted in rapid growth ethanol production. The dry grind corn ethanol process is the most common ethanol production process in the United States. In the dry grind process, the whole-ground corn is fermented to produce ethanol and distillers dried grains with solubles. The generated distillers dried grains with solubles are primarily used by farmers to feed livestock. However, drying distillers grains consumes large amounts of energy. As a result, distillers dried grains with solubles are more expensive than wet distillers grains. To reduce operational costs of the drying process and environment impacts, such as greenhouse emissions some other distillers grains with relatively high moisture content, including decanter wet cake and condensed corn solubles (syrup) are often considered as alternative animal feed ingredients.

Multiple effect evaporation is the typical method used to concentrate solids in these co-products, but it requires a large amount of specialized equipment with significant energy consumption. Known stillage clarification systems aim to increase the quality of solids and liquids recovered at atmospheric pressure and temperature from a stillage stream generated as a by-product of an ethanol production process. However, these systems have not yet been perfected.

For example, in a traditional stillage clarification system, as shown in FIG. 1, whole stillage 20 is generally processed through a two-phase decanting centrifuge 22, such as the two-phase decanting centrifuge 22 shown in FIG. 2. The underflow 24 from the decanting centrifuge 22 generally has 33 to 38% dry solids content. The resulting dry product is often termed cake. The water leaving the decanting centrifuge 22 in the overflow 26 after most of the solids have been removed is called centrate. The overflow 26 from the decanting centrifuge 22 is generally split into two approximately equal mass fractions. The first mass fraction is used as backset 28 to the ethanol plant for mash bill incorporation. The second mass fraction is used as evaporator feed 30 for concentration and removal from the ethanol plant. The evaporator feed 30 is commonly concentrated through a two-effect evaporator (though more or fewer evaporation effects are sometimes used). It is common that the discharged vapors from the second (last effect) effect evaporator 34 are directed to the reduced pressure distillation process 36, e.g. one or more distillation columns ("beer columns"). Process evaporator condensate 38 is recovered between the first effect evaporator 32 and second effect evaporator 34. This evaporator condensate 38 is used as part of the mash bill for fermentation recipe with or without pretreatment before incorporation.

During the evaporation process the condensed solubles (CCDS or syrup, either fully or partly concentrated) 40 are taken to an oil recovery centrifuge 42. The oil recovery centrifuge 42 is often a horizontal bowl three phase decanting centrifuge or a vertical stack three phase centrifuge. Oil 44 is recovered from the syrup stream 46 and represents a saleable product. The de-oiled syrup 48 is optionally returned to evaporation to remove more water or, if the concentration is sufficient for the plant operation, is combined with the heavy solids recovered from the first two-phase decanting centrifuge 22. The combination of the syrup with the heavy solids 50 creates a product called distillers wet grains plus solubles (DWGS) 52. The DWGS 52 can alternately be processed through a dryer 54 to make distillers dried grains plus solubles (DDGS). The energy required to dry the grains is significant, but many locations have insufficient market demand for DWGS 52 and are forced to expend the energy to dry the product for economies in shipping as well as shelf-life extension. At times facilities will sell CCDS 48 as an animal feed into local feed markets.

Prior efforts to lessen energy required to dry the product prior to shipping have not worked as intended. For example, an additional evaporator 56 can be placed upstream of the two-phase decanting centrifuge 22. Yet doing so proves ineffective; because a portion of the whole stillage 20 becomes evaporator condensate 38, the change in density differential of the whole stillage 20 travelling to the two-phase decanting centrifuge 22 adversely affects operation of the two-phase decanting centrifuge 22, thereby nullifying the opportunity for a more efficient configuration.

An exemplary two-phase decanting centrifuge 22 is shown in FIG. 2. The two-phase decanting centrifuge 22 comprises a bowl 58, a scroll/conveyer 60, and main bearings 62. A feed/slurry 64 can enter the two-phase decanting centrifuge 22 and subsequently separated into solids discharge 66 and liquid discharge 68.

Thus, there is a need in the art for providing a cheaper and efficient way to improve value for whole stillage, thin stillage, partly concentrated thin stillage, and syrup.

Known traditional clarification systems employ evaporators which are highly susceptible to fouling (i.e., suspended particles form deposits on, or are "burned" to, evaporator surfaces). For example, FIG. 3 exemplifies the performance of a standard, well running two effect falling film evaporator 74. The example is performed at 2000 pounds per minute (lbs/min) centrate flow 26 with thermal exhaust energy from the second effect 34 driving a reduced pressure beer stripping column 36. The evaporator 74 runs on standard thin stillage as produced by most ethanol plants today with a total dry solids content of about 7%, a common arrangement in the United States fuel ethanol industry. For this example, the low-pressure beer column 36 operates at a desired operating temperature of approximately 185F at the bottom of the column to get sufficient stripping of ethanol in the beer. The operating pressure will be approximately 8.31 pounds per square inch absolute (steam saturation pressure at 185F).

Centrate 26 from a decanting centrifuge 22 is split into approximately 50% mass flow to backset 28 and approximately 50% mass flow to evaporation feed 30. The centrate 22 contains approximately 7% total solids and 1000 gpm is directed to the two-effect evaporator 74. A steam source 72 is directed to the shell side of the first effect evaporator 32. The steam condenses on the tubes transferring the latent heat energy of condensation to the liquid inside the tubes. The heat absorbed by the liquid traveling through the tubes creates steam. This steam is directed to the second effect evaporator 34.

A first approximation shows that for every mass unit of steam condensed on the evaporator tubes one mass unit of water boils in the evaporator causing steam to be produced and leave the evaporator 74. The steam produced in the first effect evaporator 32 is directed to the shell side of the second effect evaporator 34. The first effect steam condenses on the shell side transferring the energy to the liquid in the tubes. This condensed liquid, termed process condensate or evaporator condensate 38, is withdrawn from the shell side of the second effect. In this example, the condensate flow is 400 lbs per minute.

The steam produced in the second effect evaporator 34 is directed to the beer column 36. The syrup 48 draw from this operation is approximately 200 lbs per minute at 35% solids. Note that the temperature in the first effect is 205° F., the second effect is 195° F., and the beer column temperature is 185° F.

FIG. 4 exemplifies the performance of a standard, two effect falling film evaporator 74 that is undergoing tube fouling. The example of FIG. 4 is performed under identical conditions to the example of FIG. 3 however represents a standard evaporator which has been operating in a way that fouling is starting to occur. Standard thin stillage tends to produce rapid fouling at approximately 215° F. and above. Thus, the evaporator 74 is showing signs of the onset of rapid fouling as the temperature in the first effect has now risen to 215° F. The fouled evaporator 74 shall soon need to be serviced, resulting in lost productivity and/or added cleaning cost, and the use of expensive chemistries and/or frequent cleaning are needed to sustain continued operation.

Thus, there is a need in the art to reduce fouling potential without needing to use expensive chemistries or frequently clean evaporator(s).

SUMMARY OF THE INVENTION

Therefore, it is a primary object, feature, or advantage of the present invention to improve on or overcome the deficiencies in the art.

It is still yet a further object, feature, or advantage of the present invention to provide a stillage clarification system that may be used in a wide variety of applications.

It is still yet a further object, feature, or advantage of the present invention to provide a stillage clarification system that is cost effective.

It is still yet a further objective, feature, or advantage of the present invention to provide a stillage clarification system that produces at least one fraction of stillage material that is enriched in protein content.

It is still yet a further objective, feature, or advantage of the present invention to provide a stillage clarification system that produces at least one fraction of stillage material that is enriched in fiber content.

It is still yet a further object, feature, or advantage of the present invention to provide a stillage clarification system which is easily operated.

It is still yet a further object, feature, or advantage of the present invention to provide a stillage clarification system that is easily assembled or installed, disassembled or uninstalled, repaired, and cleaned.

It is still yet a further object, feature, or advantage of the present invention to provide methods of operating the stillage clarification system accomplishing some or all of the previously stated objectives.

The following provides a list of aspects or embodiments disclosed herein and does not limit the overall disclosure. It is contemplated that any of the embodiments disclosed herein can be combined with other embodiments, either in full or partially, as would be understood from reading the disclosure.

According to some aspects of the present disclosure, a stillage clarification process comprises static density and/or settling velocity classification devices, e.g., hydrocyclone(s), and subsequent mechanical separation device(s), e.g., centrifuges, for fractionation of stillage from a grain ethanol plant. These devices split the stillage into fractions with compositional assays per bushel of grain processed that are more desirable than DDGS as a whole. A first fraction of the separation may comprise, preferably, about 45% to 70% protein and about 1% to 9% fat; more preferably, about 50% to 65% protein and about 3% to 7% fat; and most preferably, about 55% to 60% protein and about 4% to 6% fat. A second fraction of the separation may comprise distillers corn oil with a by-product yield of, between about 0.7 and 1.3 pounds per bushel; more preferably, between about 0.8 and 1.2 pounds per bushel; and most preferably, between about 0.9 and 1.1 pounds per bushel. A third fraction of the separation may be enriched in fiber and may comprise, preferably, about 10% to 28% protein and about 1% to 10% fat; more preferably, about 15% to 25% protein and about 3% to 8% fat; and most preferably, about 19% to 23% protein and about 4% to 7% fat.

According to some additional aspects of the present disclosure, an evaporator feed may be substantially depleted in suspended solids, thereby allowing a high solids concentration of a final evaporator product, i.e., syrup, through an evaporator with a final dry matter concentration, preferably, between about 40% and 85%; more preferably, between about 45% and 75%; and most preferably, about 55% and 65% on a dry matter basis.

According to some additional aspects of the present disclosure, the evaporator feed may be lower in fouling potential than that of traditional thin stillage, thereby allowing a higher temperature of the stillage inside an evaporator process. The reduction in fouling allows evaporation systems to be built that will require less freshly produced energy per unit of water evaporative capacity. Evaporation in corn processing generally has a practical or effective upper boundary temperature limit and a practical or effective lower boundary temperature limit. For example, if an evaporator lower temperature boundary is 185° F. and the upper boundary temperature is 215° F., there is approximately 30° F. of useful temperature range for evaporation. A two-effect evaporator (such as a falling film evaporator) could be constructed with the first effect at 205° F., the second effect at 195° F. and the condenser temperature at 185° F. For such a system, this two-effect evaporator requires one unit of fresh steam to be produced to remove approximately two pounds of water by evaporation. If the upper temperature boundary could be raised, additional evaporation effects could be designed into an evaporator. For example, raising the upper boundary temperature to 245° F. allows approximately 60° F. of useful temperature range for evaporation. A three-effect evaporator (such as, for example, a falling film evaporator) could be constructed with the first effect at 215° F., the second effect at 205° F., the third effect at 195° F. and the condenser temperature at 185° F. For such a system, this three-effect evaporator requires one unit of fresh steam to be produced to remove approximately three pounds of water by evaporation. Similarly, a four-effect evaporator (for example, a falling film style) could be constructed with the first effect at 225° F. and the condenser at 185° F. For such a system, this four-effect evaporator requires one unit of fresh steam to be produced to remove approximately four pounds of water by evaporation. Similar systems could be constructed with a five-effect evaporator and a six-effect evaporator. One can see that these designs would be substantially more efficient use of energy.

The reduced fouling potential and higher temperature of evaporation also may allow additional effect(s) to be placed before an existing evaporation system. For example, additional effects can be placed before a sub-atmospheric beer stripper which reduces backset requirement without substantially increasing energy per unit of ethanol produced. Additional effects include increasing a two-effect evaporator to a three-effect evaporator, a two-effect evaporator to an evaporator with more than three effects, a three-effect evaporator to a four-effect evaporator, and a three-effect evaporator to an evaporator with more than four effects. Alternative embodiments may allow the energy sink (condenser cooling source) to be directed into the cooling tower or other suitable cooling source rather than distillation. The concepts and principles described herein apply equally well to those embodiments as one of ordinary skill in the art will readily understand. The low fouling properties of the newly treated thin stillage allow for additional effect(s) of evaporation without changing the energy or temperature of energy input into a reduced atmospheric beer stripping system.

According to some additional aspects of the present disclosure, with only minimal additional energy input into the system, the amount of thin stillage evaporated may be, preferably, about 10% to 100% higher than that of the traditional thin stillage; more preferably, about 25% to 80% higher than that of the traditional thin stillage; and most preferably, about 35% to 70% higher than that of the traditional thin stillage.

According to some additional aspects of the present disclosure, the process may further comprise producing a substantially larger portion of clean process condensate. If a three-effect evaporator is used, the additional amount of process condensate produced/available (in comparison to a two-effect evaporator powering a reduced pressure beer column) is, preferably, about 50% to 150% higher; more preferably about 75% to 125% higher; and most preferably about 85% to 115% higher. If a four-effect evaporator is used, the additional amount of process condensate produced/available is, preferably, about 100% to 300% higher; more preferably about 150% to 250% higher; and most preferably about 175% to 225% higher.

According to some additional aspects of the present disclosure, the additional evaporation of thin stillage may allow for a better-quality makeup water to fermentation. The makeup water, being derived from additional process condensate, is substantially depleted in non-water components. The additional makeup water can be used to supplant backset water, thereby providing a water makeup to the fermentation recipe (cook water plus backset) that is substantially depleted in non-water components.

According to some additional aspects of the present disclosure, the process may further comprise using a portion of process evaporator condensate to remove (wash), as a suspension or solution, valuable components, such as water soluble components and small particle sized insoluble components, e.g., salts, fine particle size proteins, bio-oils, and breakdown components of bio-oils, from a high fiber feed. The amount of wash water can comprise any amount desired based on quantity of process condensate water available, water balance considerations, and quality of feed product desired. The removal (washing) of valuable components produces an animal feed higher in fiber purity. The components removed from the high fiber feed are recycled into the next fermentation cycle and/or moved into the oil recovery and high protein purity recovery part of the process for capture as additional oil and/or additional high protein volume. The use of the additional process condensate may result in the recovery of a saleable bio-oil and a protein feed of, preferably, about 45% to 70% purity; more preferably, about 50% to 60% purity; and most preferably, about 55% to 60% on a dry matter basis.

According to some additional aspects of the present disclosure, a surfactant, such as polysorbate 80 (commercially available as Tween 80 from Sigma-Aldrich), may be used to enhance oil removal from the concentrated stream of fine suspended solids (enriched in protein from using the hydrocyclones and thereafter the disk centrifuges) and/or further increase protein purity. Other suitable surfactants may include, but are not limited to, polysorbate 20 (commercially available as Tween 20 from Sigma-Aldrich), polyethylene glycol tert-octylphenyl ether (commercially available as Triton X-100 from Sigma-Aldrich), polyethylene glycol trimethylnonyl ether (commercially available as Tergitol TMN-6 from Sigma-Aldrich), poly(propylene glycol)-block-poly(ethylene glycol)-block-poly(propylene glycol) (commercially available as Pluronic 10R5 from Sigma-Aldrich, preferably having an average molecular weight of 1950), polyoxyethylene (23) lauryl ether (commercially available as Brij L23 from Sigma-Aldrich), and mixtures thereof.

The stillage clarification process can optionally include washing the concentrated stream of fine suspended solids with process condensate, thereby producing a feed lower in fat content and surprisingly higher in protein content than the corresponding reduction in crude fat content would suggest. Additionally, a higher amount of oil is recovered.

According to some additional aspects of the present disclosure, solids binding polymer(s) can optionally be used to increase dryness of high protein feeds recovered from a two-phase centrifuge, such as a decanting and/or desludging centrifuge. The amount of water sent to the dryer operation may thus be further lowered, thereby lowering energy input and dryer evaporation demands.

According to some additional aspects of the present disclosure, the first by-product may be enriched in protein and depleted in fiber. Of the first by-product produced as a result of the stillage clarification process, there may be, preferably, between about 0.8 (eight tenths) and 3.5 (three and one half) pounds per bushel; more preferably, between about 2.0 (two) and 3.0 (three) pounds per bushel; and most preferably, between about 2.5 (two and one half) and 3 (three and one half) pounds per bushel.

According to some additional aspects of the present disclosure, the second by-product may be greatly enriched in bio-oil and bio-oil degradation products. The second by-product may be, preferably, between about 60% and 100% bio-oil and bio-oil degradation products; more preferably, between about 80% and 99% bio-oil and bio-oil degradation products; and most preferably, between about 90% and 97% bio-oil and bio-oil degradation products.

According to some additional aspects of the present disclosure, the third by-product may be depleted in protein, depleted in oil, depleted in solubles and enriched in fiber. Of the third by-product produced as a result of the stillage clarification process, there may be, preferably between about 7.0 (seven) and 10.0 (ten) pounds per bushel; more preferably, between about 8.0 (eight) and 9.5 (nine and one half) pounds per bushel; and most preferably, between about 8.5 (eight and one half) and 9 (nine) pounds per bushel.

According to some additional aspects of the present disclosure, the process may further comprise initially storing the stillage in a whole stillage tank.

According to some additional aspects of the present disclosure, the process may further comprise recovering soluble proteins from the whole stillage and concentrating said proteins to at least about 30% purity for sale.

According to some other aspects of the present disclosure, a stillage clarification system may comprise a grain ethanol plant producing stillage, a hydrocyclone, and a centrifuge (e.g., one or more high recovery disc bowl centrifuges). The stillage can be split into fractions with mass and compositional assays per bushel of grain processed according to any of the aspects previously described above.

According to some additional aspects of the present disclosure, the system may further comprise a whole stillage tank.

According to some additional aspects of the present disclosure, the system may further comprise a decanting centrifuge.

According to some additional aspects of the present disclosure, the system may further comprise an evaporator.

According to some additional aspects of the present disclosure, the system may further comprise a means for recycling water.

According to some additional aspects of the present disclosure, the system may further comprise a surfactant and/or other demulsifying chemicals to enhance oil removal from concentrated fine suspended solids and/or to increase protein purity.

According to some additional aspects of the present disclosure, the system may further comprise washing with condensate or another suitable water to enhance oil removal from concentrated fine suspended solids and/or reduce ash content and/or to increase protein purity.

According to some additional aspects of the present disclosure, the system may further comprise a reduced fouling evaporator feed product.

According to some additional aspects of the present disclosure, the system may further comprise a higher approach temperature during evaporation with reduced heat exchange surface fouling (for example, reduced tube fouling).

According to some additional aspects of the present disclosure, the evaporator may be selected from the group consisting of a two-effect evaporator, a three-effect evaporator, a four-effect evaporator, and a more than four-effect evaporator.

According to some additional aspects of the present disclosure, the system may further comprise an additional evaporator effect in front of an existing evaporator allowing for additional process condensate production and lowering backset requirement without substantial increasing energy to evaporation.

According to some additional aspects of the present disclosure, the additional process condensate production may allow for more wash water available for the production of a higher purity fiber product and a higher purity protein product.

According to some other aspects of the present disclosure, the fractions according to any of the aspects described above may be collected as a result of an improved stillage clarification process.

According to some additional aspects of the present disclosure, the fractions may be collected with a saleable oil and, preferably, an approximately 45%-70% protein purity animal feed. More preferably, an approximately 50% protein purity animal feed may be collected.

These or other objects, features, and advantages of the present invention will be apparent to those skilled in the art after reviewing the following detailed description of the illustrated embodiments, accompanied by the attached drawings.

In one embodiment of the present invention, a stillage clarification process may comprise: using a static density classification device and, subsequently, mechanical separation devices for fractionation of stillage from a grain ethanol plant; and splitting the stillage into fractions, wherein the fractions may comprise: a first fraction, enriched in insoluble protein and comprising approximately 45% protein and approximately 8% fat; a second fraction comprising distillers corn oil; and a third fraction, enriched in fiber and comprising approximately 25% protein and approximately 8% fat.

In a further embodiment, a stillage clarification process may further comprise using a settling velocity classification device and splitting the stillage into fractions with mass and compositional assays, wherein: i) a first fraction is enriched in insoluble protein and has a yield of 0.8-3.5 pounds per bushel on a dry matter basis, comprising approximately 45% to 70% protein and 3% to 8% fat; ii) a second fraction comprises distillers corn oil with a yield of at least 1.0 pounds per bushel on a dry matter basis; iii) a third fraction is enriched in fiber and has a yield of 7-10 pounds per bushel on a dry matter basis, comprising 22% to 28% protein and less than 8% fat; and iv) a fourth fraction is enriched in soluble protein and has a yield of 4.4-4.8 pounds per bushel on a dry matter basis, comprising at least 30% soluble protein and not more than 3% fat.

In a further embodiment, an evaporator feed may be substantially depleted in suspended solids and fed through an evaporator thereby creating a final evaporator product, syrup, being the fourth fraction and optionally having a final dry matter concentration between 50% to 80%.

In a further embodiment, an evaporator feed may be lower in fouling potential than that of traditional thin stillage, thereby allowing a higher temperature of the stillage inside an evaporator process and therefore optionally allowing additional evaporation effect(s) to be placed before a sub-atmospheric beer stripper which: i) reduces backset requirement without substantially increased energy per unit of ethanol produced; and/or ii) substantially increases the amount that can be evaporated, per pound of steam, compared to traditional thin stillage.

In one embodiment of the present invention, a stillage clarification system may comprise a grain ethanol plant producing whole stillage, whereby the whole stillage is fractionated by hydrocyclone(s), whereby the hydrocyclone overflow is fractionated by disk centrifuge(s), whereby the hydrocyclone underflow if fractionated by decanter centrifuge(s), and wherein the whole stillage is split into fractions, said fractions comprising: i) a first fraction, enriched in insoluble protein and comprising approximately 45% protein and approximately 8% fat; ii) a second fraction comprising distillers corn oil; iii) a third fraction, enriched in fiber and comprising approximately to 25% protein and approximately 8% fat.

In a further embodiment, whole stillage may be split into fractions with mass and compositional assays per bushel of grain processed, said fractions comprising: i) a first fraction, enriched in insoluble protein and having a yield of 0.8-3.5 pounds per bushel on a dry matter basis, comprising 45% to 70% protein and 3% to 8% fat; ii) a second fraction comprising distillers corn oil with a yield of at least 1.0 pounds per bushel on a dry matter basis; iii) a third fraction, enriched in fiber and having yield of 7-10 pounds per bushel on a dry matter basis, comprising 22% to 28% protein and less than 8% fat; and iv) a fourth fraction, enriched in soluble protein, and having a yield of 4.4-4.8 pounds per bushel on a dry matter basis, comprising at least 30% soluble protein and not more than 3% fat.

In an even further embodiment, a stillage clarification system may further comprise using a portion of process evaporator condensate to remove, as a suspension or solution, water soluble components and/or insoluble components from a hydrocyclone underflow and optionally moving those components into the overflow and disc centrifuge allowing higher yields of bio-oil and protein feed.

In an even further embodiment, a stillage clarification system may further comprise using a portion of process evaporator condensate to remove, as a suspension of solution, water soluble components and/or insoluble components to enhance oil removal and/or ash removal from an already fractionated and concentrated fine suspended solids stream and/or to increase protein purity.

In an even further embodiment, a surfactant and/or a demulsifying chemical may be used to enhance oil removal from an already fractionated and concentrated fine suspended solids stream and/or to increase protein purity.

In one embodiment of the present invention, a stillage clarification system may comprise using hydrocyclone(s), for fractionation of whole stillage from a grain ethanol plant, and splitting the whole stillage into fractions, said fractions comprising: i) a first fraction, substantially enriched in protein, substantially enriched in fat, substantially depleted in fiber, and at the same time having a flow rate reduced by approximately one third by mass compared to the whole stillage feed; and ii) a second fraction, substantially enriched in fiber and substantially depleted in fat, and depleted in protein; and at the same time having a flow rate reduced by approximately two thirds by mass compared to the whole stillage feed.

In a further embodiment, whole stillage may be split into fractions with mass and compositional assays.

In an even further embodiment, a stillage clarification system may further comprise using a portion of process evaporator condensate to remove, as a suspension or solution, water soluble components and/or insoluble components from a hydrocyclone underflow and optionally moving those components into the overflow and disc centrifuge allowing higher yields of bio-oil and protein feed.

In an even further embodiment, a stillage clarification system may further comprise using a portion of process evaporator condensate to remove, as a suspension of solution, water soluble components and/or insoluble components to enhance oil removal and/or ash removal from an already fractionated and concentrated fine suspended solids stream and/or to increase protein purity.

In an even further embodiment, a surfactant and/or a demulsifying chemical may be used to enhance oil removal from an already fractionated and concentrated fine suspended solids stream and/or to increase protein purity.

In a further embodiment, an enriched fiber fraction may be substantially increased in dry substance by a whole stillage decanter, compared to traditional whole stillage 'wet cake' and thereby confer due to lower water content: i) transportation energy savings in the enriched fiber 'wet cake'; and/or ii) dryer energy savings and/or capacity increase in the production of dried enriched fiber powder.

In an even further embodiment, a whole stillage decanter may be optionally in high-torque configuration.

BRIEF DESCRIPTION OF THE DRAWINGS

FIG. 6A shows a front elevation view of a hydrocyclone, according to some aspects of the present disclosure.

FIG. 6B shows a right-side elevation view of the hydrocyclone of FIG. 6A, according to some aspects of the present disclosure.

FIG. 6C shows a left-side elevation view of the hydrocyclone of FIG. 6A, according to some aspects of the present disclosure.

Figure 1:
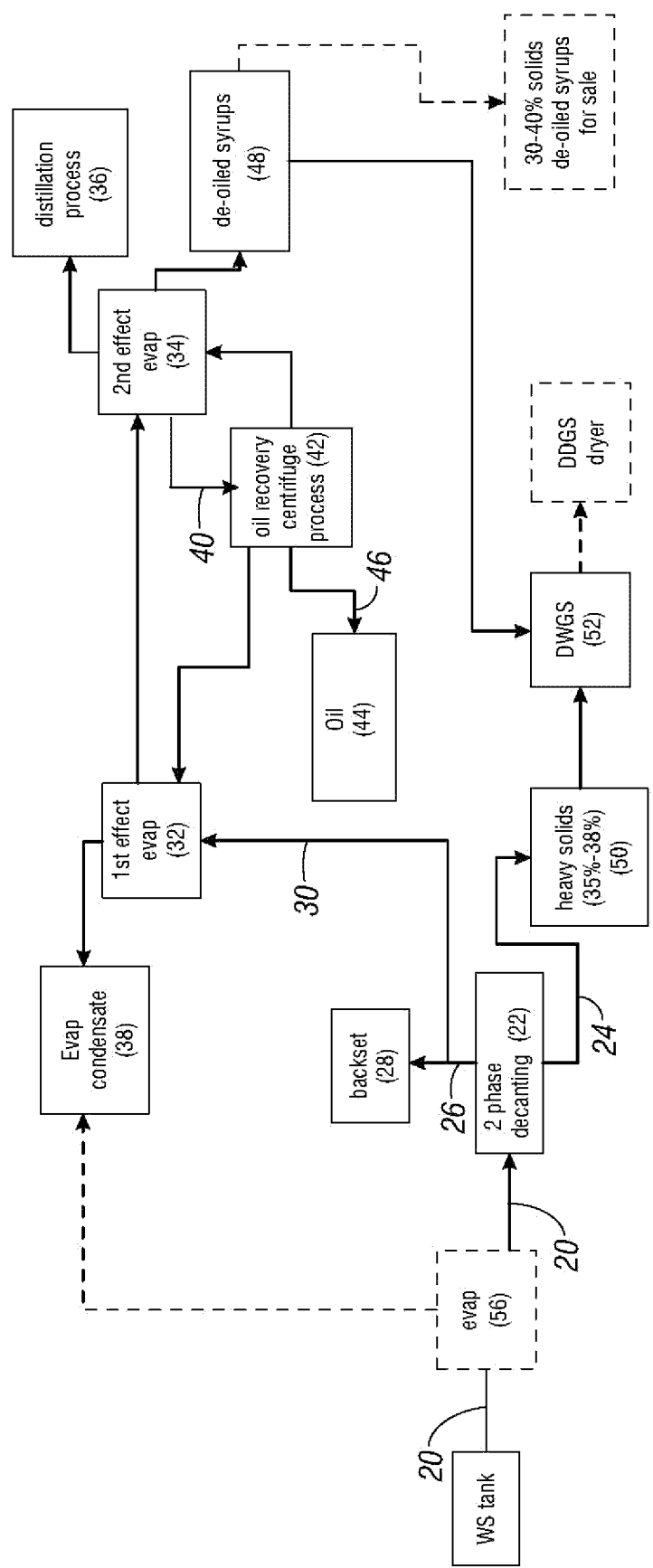
FIG. 1 shows a schematic view of a classical ethanol plant with process flow diagram of whole stillage processing into bio-oil and WDGS and/or DDGS, according to some aspects of the present disclosure.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION OF THE INVENTION

Definitions—Introductory Matters

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about", "approximately", or "substantially" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Numerical adjectives and adverbs (e.g., first, second, etc.), positional adjectives and adverbs (e.g., vertical, horizontal, forward, aft, etc.), nouns describing orientation of an object (e.g., top, bottom, sides, etc.), and the like are referenced according to the views presented. These terms are used only for purposes of description and are not limiting unless these terms are expressly included in the claims. The physical configuration of an object or a combination of objects may change without departing from the scope of the present invention.

The terms "weight percent," ".%," "percent by weight," "% by weight," and variations thereof, as used herein refer to the concentration of a substance as the weight of that substance divided by the total weight of the composition and multiplied by 100.

The terms "fat" and "oil" are used in the industry fairly interchangeably. They refer generically to lipid material derived from plant sources. The terms "oil" and "fat" can include, without limitation, free fatty acids, monoacyl glycerides, diacylglycerids, triacylglycerides, waxes and gums, emulsions of each and any of these compounds, and the like. The term "fat content" is commonly used to describe the quantity of fat present in animal feed(s). Fat content may be expressed in terms of weight percent or any other suitable unit of measurement.

The term "DCO" refers to distillers corn oil. This is the oil commonly recovered from fuel ethanol plants in the United States. While the term "corn" is part of DCO, it is understood in this document that the DCO oil can contain appreciable amounts of oil from sorghum if the ethanol production facility is mixing appreciable amounts of sorghum into the inbound grain. The ratio of sorghum can be from 0% to 100% of the inbound grain in the process where DCO is recovered.

The term "emulsion" refers to a quasi-stable mixture of water+oil+other compound(s). The emulsion is generally present in various concentrations in the recovered DCO material. Emulsion is generally 70% oil or higher on a dry matter basis. "Demulsifiers", "demulsifying chemicals", or emulsion breakers, are a class of specialty chemicals used to separate emulsions, for example, water in oil. Demulsifiers may be based on the following chemistries: acid catalysed phenol-formaldehyde resins, base catalysed phenol-formaldehyde resins, epoxy resins, polyethyleneimines, polyamines, di-epoxides, polyols, and dendrimer.

The term "HC" refers to static density and/or velocity classification devices, such as hydrocylones.

The term "steam" encompasses both of true steam and vapor.

A decanter is a vessel that is used to hold the decantation of a liquid (such as beer) which may contain solids. A centrifuge is a piece of equipment that puts an object in rotation around a fixed axis (spins it in a circle), applying a force perpendicular to the axis of spin (outward) that can be very strong. A decanting centrifuge has properties of both a decanter and a centrifuge.

The term "conical plate centrifuge" may be interchangeably used with the term "disc bowl centrifuge", "disc stack centrifuge", and "disc stack separator". The conical plate centrifuge is a type of centrifuge that has a series of conical discs which provides a parallel configuration of centrifugation spaces. The conical plate centrifuge is used to remove solids (usually impurities) from liquids or to separate two liquid phases from each other by means of an enormously high centrifugal force. The denser solids or liquids which are subjected to these forces move outwards towards the rotating bowl wall while the less dense fluids move towards the center. The special plates (known as disc stacks) have small spacers between each plate, greatly reducing the particle settling distance, increasing the effective surface settling area, which thereby substantially speeds up the separation process. Different stack designs, arrangements and shapes are used for different processes depending on the type of feed present. The concentrated denser solid or liquid is then removed continuously, manually or intermittently, depending on the design of the conical plate centrifuge. The conical plate centrifuge is typically very suitable for clarifying liquids that have small proportion of fine suspended solids.

The term "UF" refers to the high suspended solids stream from a solid/liquid separation device. Classically, "UF" is used for the underflow stream from a hydrocyclone and the underflow stream from a disc stack centrifuge. As used herein, "UF" has the classical meaning for those two devices as well as the high suspended solids stream from any solid/liquid separation device.

The term "OF" refers to the low suspended solids stream from a solid/liquid separation device. Classically, "OF" is used for the overflow stream from a hydrocyclone and the overflow stream from a disc stack centrifuge. In this document "OF" has the classical meaning for those two devices as well as the low suspended solids stream from any solid/liquid separation device.

The term "syrup" is synonymous with "condensed corn distillers solubles" or CCDS. Syrup is produced by the evaporative concentration of the non-water materials found in traditional thin stillage. Syrup is produced by the evaporative concentration of the non-water materials found in the reduced solids thin stillage as taught herein.

The term "DMB" refers to dry matter basis. For calculations of concentration of a material the DMB refers to the concentration of the analyte in question after all of the water has been removed from the material, generally by laboratory gravity oven. After all moisture has been removed the analysis of the material is performed and the concentration of the desired analyte is reported on a dry matter basis (DMB).

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

Overview

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

Figure 2:
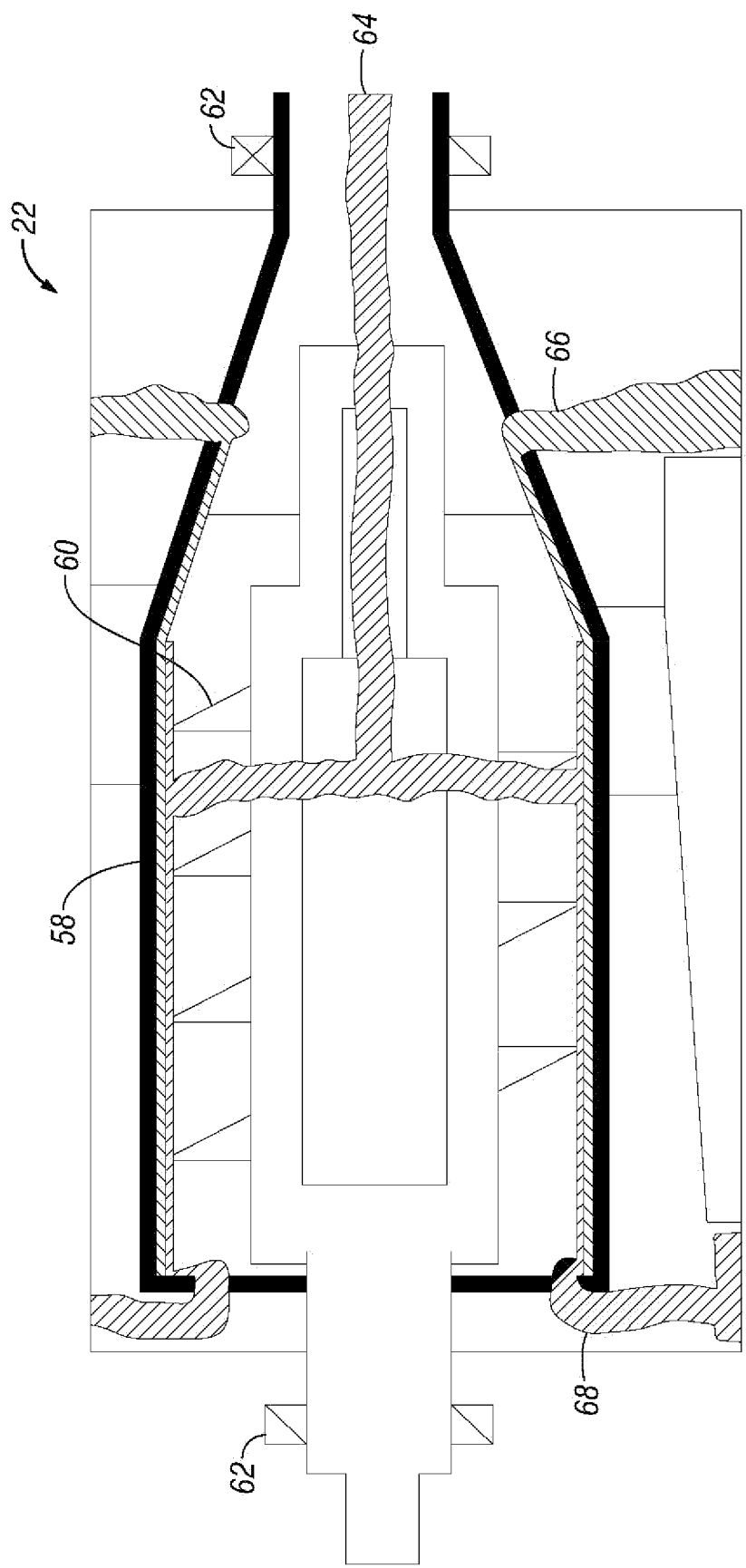
FIG. 2 shows a perspective view of a decanter type centrifuge, according to some aspects of the present disclosure.
Figure 5:
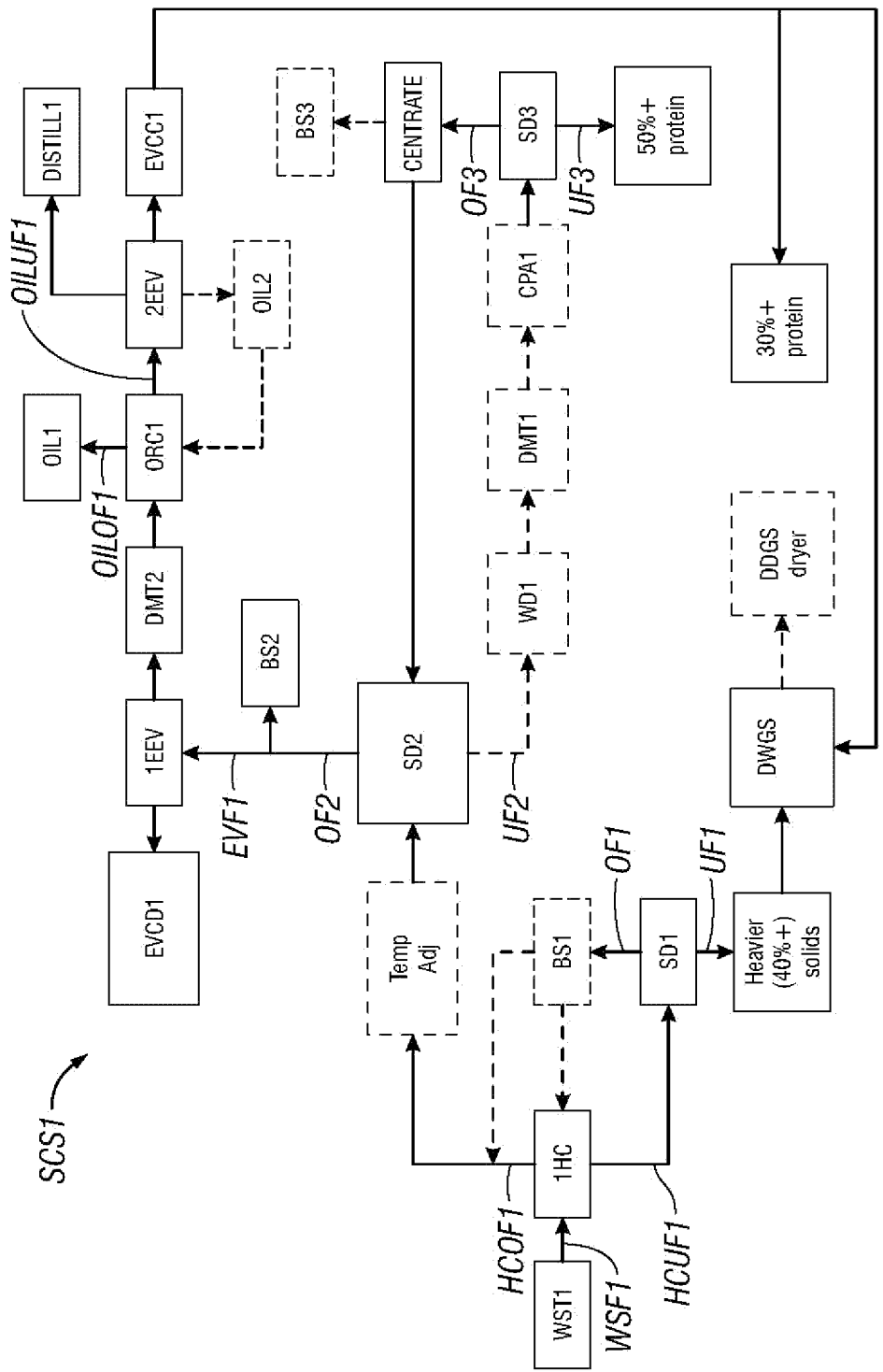
FIG. 5 shows a schematic view of an improved stillage clarification system, according to some aspects of the present disclosure.

An improved stillage clarification system SCS1 is shown in FIG. 5. Whole stillage may be stored in a whole stillage tank WST1. Whole stillage feed WSF1 may be processed through a hydrocyclone 1HC, such as the exemplary hydrocyclone HC shown in FIGS. 6A-6C. The hydrocyclone 1HC may be operated such that, in comparison to the whole stillage feed WSF1, the underflow UF1 is depleted in water, protein, and oil, and enriched in fiber. The underflow UF1 may be fed to a first solid-liquid separation device SD1 for dewatering. The first separation device SD1 can comprise a decanting centrifuge, a belt press, and/or a screw press. In a preferred embodiment, an existing two-phase decanting centrifuge (e.g., the decanting centrifuge of FIG. 2) within the plant may be repurposed to conduct the dewatering process. The dewatered concentrate can be sold as wet feed, transferred to further processing units, or dried to increase storage shelf life and reduce transportation costs. Because the hydraulic load from the underflow UF1 is substantially reduced from the whole stillage volume, fewer decanting centrifuges can be used to effectively dewater the underflow UF1 than for dewatering whole stillage flow in a traditional plant. This reduction in decanter requirement can free up existing decanting centrifuges at the plant including optionally for a different purpose, such as acting as an optional third separation device such as SD3.

In another preferred embodiment, a high torque two-phase decanting centrifuge may be used as the first solid/liquid separation device SD1 to increase dryness in concentrate material in the underflow UF1 from the first solid/liquid separation device SD1. The hydrocyclone 1HC has already removed many of the fine particles and much of the hydraulic flow from the feed prior to the first solid/liquid separation step. This removal provides a substantially lower flow volume to the decanting centrifuge while containing lower proportions of fine particles. The resulting centrate in the overflow OF1 has substantially lower liquid volume than the traditional process. In addition, the centrate in the overflow OF1 has a reduced amount of fines than the traditional process thus making for a cleaner backset material for fermentation operation. The overflow OF1 from the first separation device SD1 can be (a) added to the overflow HCOF1 or (b) fed directly to the hydrocyclone 1HC.

Because fine particle size protein materials have been transferred to the overflow HCOF1, the solids can be effectively concentrated to about 40%+ dry matter basis. In addition, increasing the dryness through the mechanical separation will move fine particles which are enriched in protein and oil into the overflow thereby allowing those higher value components to be recovered in subsequent fermentation rounds or directly into the HCOF1 stream. The compositional analysis of the concentrate product is depleted in protein and enriched in fiber. The process makes it possible to create a fiber rich portion that may be about 25% DMB or lower in protein content and about 7% DMB or lower in fat content.

Liquid overflow carries residues of protein and oil in addition to water soluble components. This water rich overflow can optionally be used as part of the mash bill recipe (commonly referred to as backset) BS1. The use as backset BS1 provides a beneficial water source to the fermentation process as well as allows the valuable insoluble feed components in the overflow HCOF1 to be recovered from whole stillage in subsequent water cycles of the ethanol plant. The water rich overflow HCOF1 can be fed to a second separation device SD2 for protein recovery and subsequent oil recovery. Prior to being fed to the second separation device SD2, the overflow HCOF1 can be treated with increased or decreased temperature. The second separation device SD2 can be, without limitation, another hydrocyclone, a nozzle disc stack machine, a desludging disc stack machine, a horizontal bowl decanting centrifuge, or a disc decanting centrifuge. The second separation device SD2 may be used to recover suspended solids high in protein concentration (about 45-70% protein DMB) depleted in oil (about 7% oil or less) with a yield of about 0.8-3.5 lbs/bu.

Optionally, the underflow from the second separation device SD2 can be diluted with water for washing out of soluble materials and fine particle contaminants, and/or optionally subsequently treated with demulsifying chemicals DMT1 to help remove oil from the suspended particles and surprisingly further increase protein purity beyond the corresponding decrease in oil content, and/or optionally treated with coagulation aids/polymers CPA1 and properly aged to increase dry solid concentration in recovery by the third separation device SD3.

Thereafter, the underflow from the second separation device SD2 can be further concentrated/purified with a third separation device SD3. The third separation device SD3 can be a decanting centrifuge (for example, the spare decanter referenced above), a desludging disc stack machine, a disc decanter machine, a filter(s) or filtration system encompassing any or all or macro-(i.e., about 50-1,000 micron), micro-(i.e., about 0.1-5 micron), or even ultra- or nano-filtration(s), or the like. At least a portion, up to 100%, of the overflow OF3 from the third separation device SD3 can be used as part of the mash bill backset water BS3. Another portion, up to 100%, of the overflow OF3 from third separation device SD3 can be optionally recycled to the second separation device SD2 to capture fine suspended particles. The underflow UF3 from third separation device SD3 may be recovered at high protein concentration with about 45%+ DMB protein and less than about 7% DMB hexane extractable concentration.

At least a portion (any percentage greater than 0, up to 100%) of the overflow from the second separation device SD2 can be split for part of the mass as backset At least a portion (any percentage greater than 0, up to 100%) of the overflow from the second separation device SD2 may undergo a subsequent oil recovery process either prior to or after the split for backset and evaporator feed, or during or after the evaporation process, and, which utilizes an oil and/or emulsion recovery centrifuge ORC1.

The overflow OF2 from the second separation device SD2 can be treated with increased or decreased temperature. The overflow OF2 from the second separation device SD2 may typically have less than about 3% suspended solids by spin test is sent to the evaporator. The overflow OF2 from the second separation device SD2 can be split for part of the mass as backset BS2 and part of the mass as evaporator feed EVF1. Evaporator condensate EVCD1 may be recovered from at least a first effect evaporator 1EEV (such as the evaporator shown in FIG. 7) and can be used for mash bill makeup (backset) BS2, process wash water (e.g., the dilution water WD1 from the underflow UF2 of the second separation device SD2), or other plant water needs. The large amount of easily separated emulsion from the second separation device SD2 may create a "creaming event," or a thick emulsion layer in the overflow OF2.

A portion of the evaporator feed EF1 may be removed from the first effect evaporator 1EEV and taken to the oil and/or emulsion recovery centrifuge ORC1. It should be appreciated that the oil and/or emulsion recovery centrifuge ORC1 can be moved or an additional oil/recovery centrifuge can be added at the thin stillage, backset, and/or evaporator locations. An emulsion breaking additive, such as polysorbate 80, can be used and/or other demulsifying treatments DMT2 can occur before the oil and/or emulsion recovery centrifuge ORC1. Emulsion concentrate and/or oil OIL1 may be recovered by the oil recovery centrifuge with a recovery rate of about 1 lb/bu or higher.

After emulsion concentrate and/or oil OIL1 recovery, the underflow OILUF1 from oil and/or emulsion recovery centrifuge ORC1 is returned, if desired, to final evaporation stages (e.g., a second effect evaporator 2EEV).

Vapors VP1 from the remaining the evaporation process (such as from the second effect evaporator 2EEV) are taken to distillation DISTILL1 or other useful location(s) for energy deposit for energy integration and energy recovery. Evaporator concentrate EVCC1 (e.g., syrup) may typically comprise about 50% to 80% dry solids content, in part due to the low suspended solids in the evaporator feed EVF1. Optionally, oil OIL2 can be recovered from the evaporator process and recycled back into the feed for the oil and/or emulsion recovery centrifuge ORC1 such that the oil may be salvaged later as OIL1.

Referring now to FIGS. 6A-6C, an exemplary hydrocyclone HC includes an upper portion HC01 and a lower portion HC02 adjoined at union HC03. Towards the top of the upper portion HC01, the exemplary hydrocyclone HC includes an inlet HC04 for receiving a solid/fluid mixture and an outlet HC05 for dispensing an overflow having a lower solids content than the solid/fluid mixture. Towards the bottom of the lower portion HC02, the exemplary hydrocyclone HC includes an outlet HC06 for dispensing an underflow having a higher solids content than the solid/fluid mixture.

Figure 7:
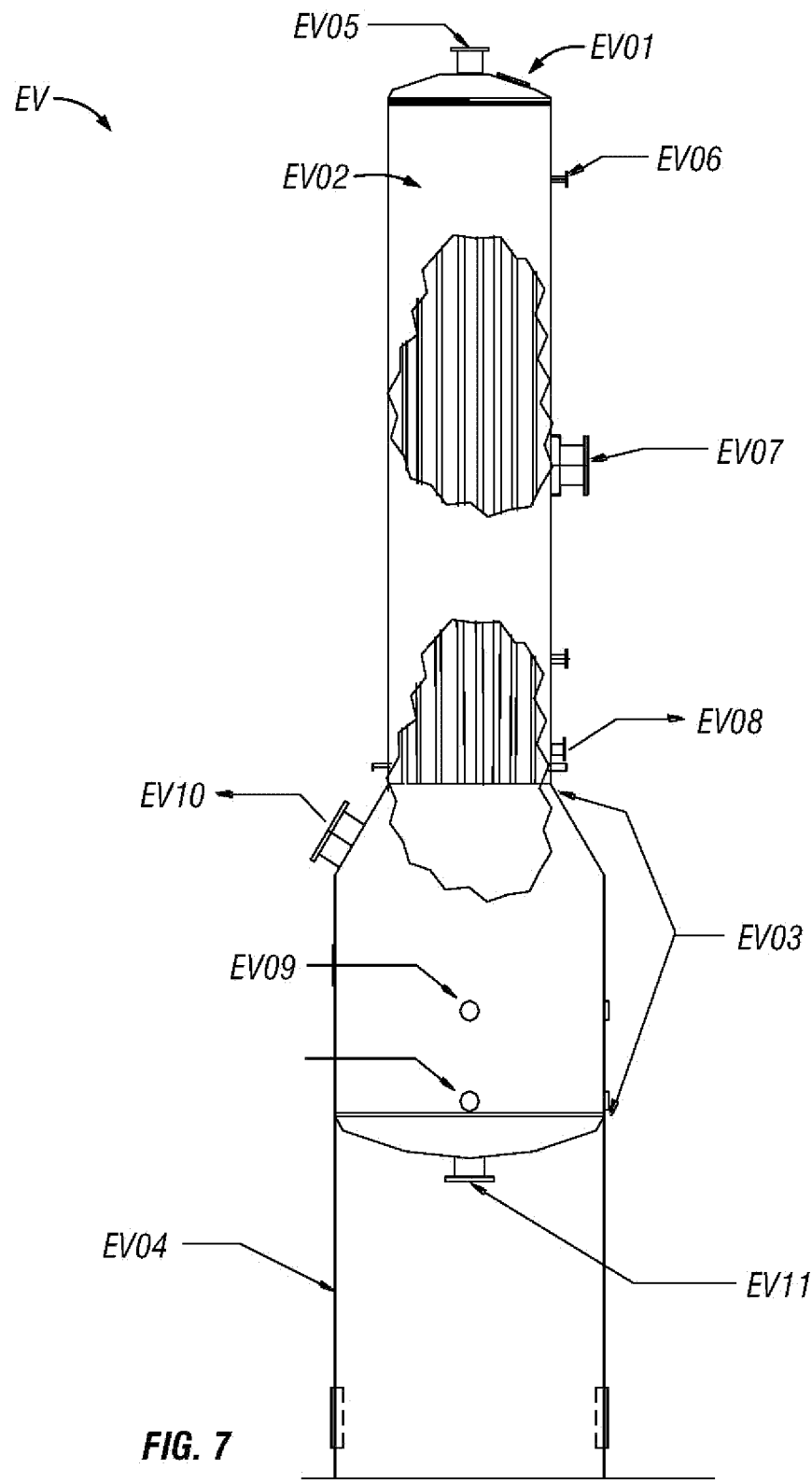
FIG. 7 shows an elevation view of an evaporator, according to some aspects of the present disclosure.

Referring now to FIG. 7, an exemplary evaporator EV comprises a shell cover EV01, a shell EV02, a bottom separator EV03 located beneath the tube EV02, and a skirt EV04 located beneath the bottom separator EV03.

The shell cover EV01 includes a centrally located liquid inlet EV05 for recirculation of a liquid from a pump.

The shell EV02 may be typically a partially hollow cylinder but may take on any known three-dimensional shape. For example, the shape of the tube EV02 may be selected from the group consisting of cylinders, ellipsoids (including spheres), partial ellipsoids (including hemispheres), regular polyhedrons (including pyramids, cubes, etc.), irregular polyhedrons, cones, and a combination thereof, or any other shape. The shell EV02 comprises tubes which run longitudinally throughout the shell EV02, a vent EV06 for steam, a steam inlet EV07 traversing an outer surface of the tube, and an outlet for condensate EV08.

The bottom separator EV03 comprises one or more windows EV09 and an outlet for vapor EV10. Towards an upper portion of the skirt EV04 near where the skirt EV04 attaches to the bottom separator EV03, there may be an outlet for liquid EV11 to a pump. The present disclosure is not limited to shell and tube evaporator types. The present invention can be equally well practiced with other evaporator types including, but not limited to, plate and frame, forced recirculation, rising film, wiped film, falling film, and any other suitable evaporator type.

Figure 8:
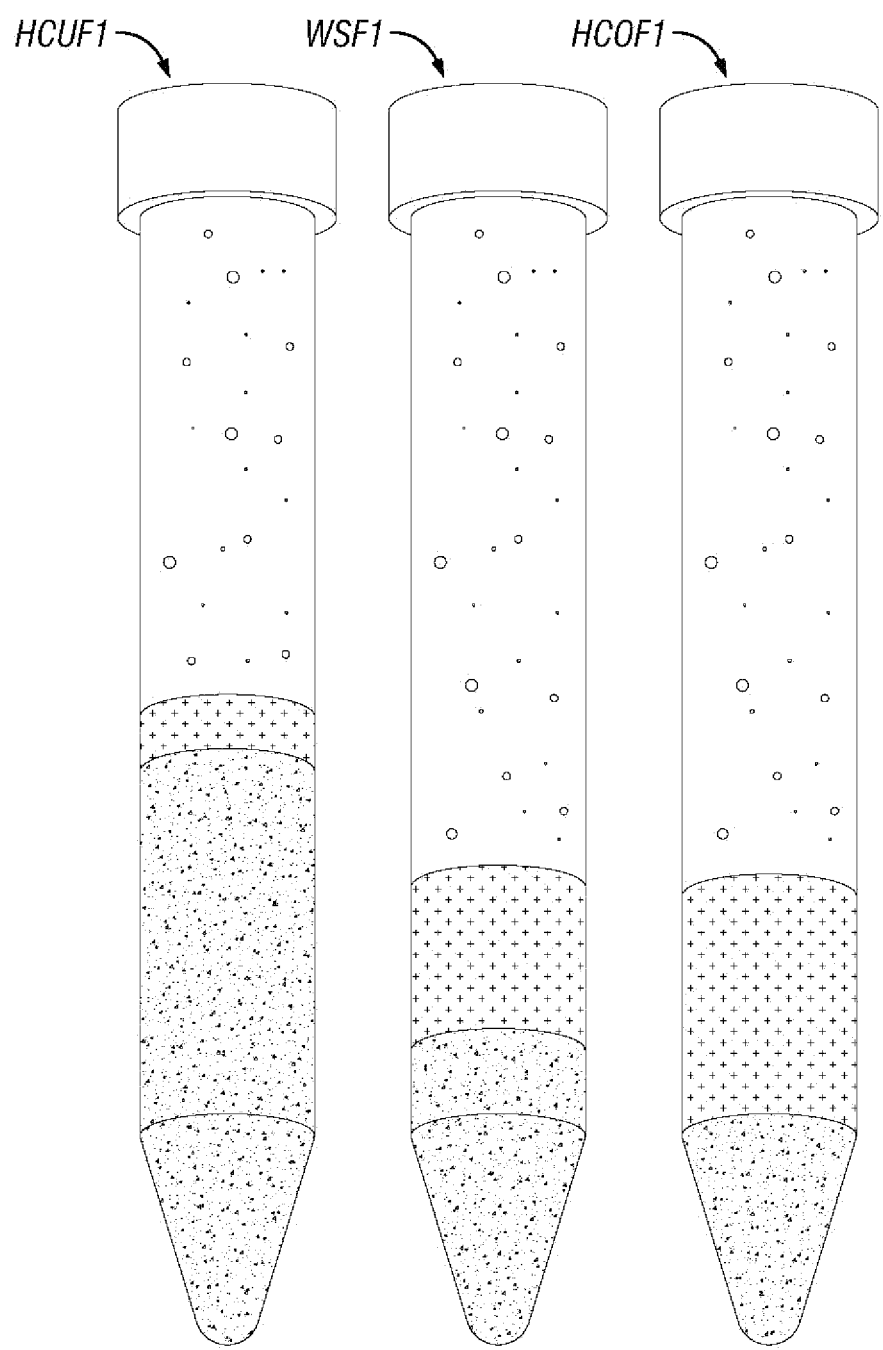
FIG. 8 shows the effect of the hydrocyclone of FIGS. 5 and 6, according to some aspects of the present disclosure.

FIG. 8 illustrates the effect of using the hydroclone in the stillage clarification system SCS1 of FIG. 5. The left spin tube is indicative of the underflow HCUF1, the middle spin tube is indicative of the whole stillage feed WSF1, and the spin right tube is indicative of the overflow HCOF1. The underflow HCUF1 has significantly more solids/large particles than the whole stillage feed WSF1, while the overflow HCUF1 has significantly less solids/large particles than the whole stillage feed WSF1, as shown in Tables 1-4.

Field work was conducted using whole stillage with a hydrocyclone (1HC), (FIGS. 6A, 6B, 6C) producing an OF1 to UF1 flow split of about 2 gallons OF1 per 1 gallon UF1. Table 1 shows the spinnable solids by a lab centrifuge as depicted in FIG. 8.

Table 1 shows a whole stillage processed by a hydrocyclone, spinnable solids by a lab centrifuge as depicted in FIG. 8.

TABLE 1

| Spinnable solids | WSF1 | Underflow (HCUF1) | Overflow (HCOFI) |
|---|---|---|---|
| % heavy compacting solids | 10.7% | 32.1% | 7.1% |
| % fine suspended solids | 14.3% | 5.4% | 17.9% |
| % soluble + oil | 75.0% | 62.5% | 75.0% |

Table 2 shows a compositional analysis of whole stillage feed WSF1, a hydrocyclone underflow HCUF1, and a hydrocyclone overflow HCOF1 from Table 1. % DM represents percent dry matter; and all other analyses are expressed on a percent dry matter basis.

TABLE 2

| Description | % DM | % crude fiber | % crude fat | % crude protein |
|---|---|---|---|---|
| WSF1 | 8.54 | 5.31 | 16.2 | 29.48 |
| HCUF1 | 10.5 | 10.93 | 10.27 | 26.3 |
| HCOF1 | 8.1 | 2.97 | 22.57 | 36.35 |

Table 3 shows results associated with a compositional analysis of hydrocyclone underflow HCUF1 processed through a standard decanter acting as SD1 from Table 2 per process flow of FIG. 5.

TABLE 3

| Description | % DM | % crude fiber | % crude fat | % crude protein |
|---|---|---|---|---|
| HCUF1 feed to SD1 | 10.5 | 10.93 | 10.27 | 26.3 |
| UF1 cake sample #1 | 36.39 | 14.98 | 7.74 | 23.84 |
| UF1 cake sample #2 | 34.84 | 14.78 | 7.55 | 24.98 |
| OF1 | 5.3 | N/D | 41.14 | 27.8 |

Table 4 shows results associated with a compositional analysis of hydrocyclone overflow HCOF1 processed through a standard decanter, in lieu of the preferred embodiment of a disk-type centrifuge, acting as SD2 from Table 2.

TABLE 4

| Description | % DM | % crude fiber | % crude fat | % crude protein |
|---|---|---|---|---|
| HCOF1 feed to SD2 | 8.63 | 3.85 | 14.81 | 27.2 |
| UF2 sample #1 | 30.87 | 10.35 | 11.08 | 45.39 |
| UF2 sample #2 | 31.34 | 8.23 | 12.66 | 46.04 |
| OF 2 sample #1 | 4.9 | N/D | 24.45 | 29.21 |
| OF2 sample #2 | 4.74 | N/D | 25.24 | 30.86 |

The process of using a hydrocylone(s) clearly moves fines from the feed material to the overflow HCOF1 while simultaneously concentrating the large, mainly fiberous materials into the underflow HCUF1 while substantially reducing the underflow liquid volume compared to the feed flow.

Table 5 shows the dry matter of underflow UF1 exiting a standard decanter acting as SD1 fed with hydrocyclone underflow HCUF1, whereby the trial aim was to positively demonstrate the ability to thereby substantially increase dryness of the fiber enriched 'wet cake', compared to traditional whole stillage decanter 'wet cake' which may be typically about 35-38% dry matter by comparison from an identical standard decanter.

TABLE 5

Decanter solids UF1 recovered from SD1

| sample # | tare pan | wet pan | dry pan | sample weight wet | dry sample | % dry matter |
|---|---|---|---|---|---|---|
| UF1 #1 | 2.5432 | 4.670 | 3.3939 | 2.127 | 0.851 | 40.0% |
| UF1 #2 | 2.5320 | 4.7076 | 3.401 | 2.176 | 0.869 | 40.0% |

The standard decanter acting as SD1 can clearly achieve a higher dryness by weight in the 'wet cake' underflow UF1 than a traditional whole stillage feed. This confers savings for the fiber enriched:

Decanter 'wet cake', DWG and/or DWGS in transportation and/or sales value by dry matter basis due to its substantially lower water content;

Dry powder DDG and/or DDGS in dryer energy by dry matter basis due to its substantially reduced water volume to remove in the DDGS Dryer.

Compared to traditional whole stillage feed WSF1 the substantially reduced volumetric flow rate of fiber enriched hydrocyclone underflow HCUF1 confers the possibility for reducing the quantity of standard decanters SD1 required to process the feedstock.

Compared to traditional whole stillage WSF1 feed the ability to achieve a substantially drier decanter 'wet cake' by dry matter basis, including optionally optimizing the configuration of the decanter SD1, including by non-limiting example a high-torque design targeting maximal dryness by weight in the underflow UF1.

An exemplary commercial embodiment of SD1 may be a Flottweg Z6E-4 series, a robust stillage decanter widely installed in the field and having both high-torque design options combined with limited scroll flex.

Figure 9:
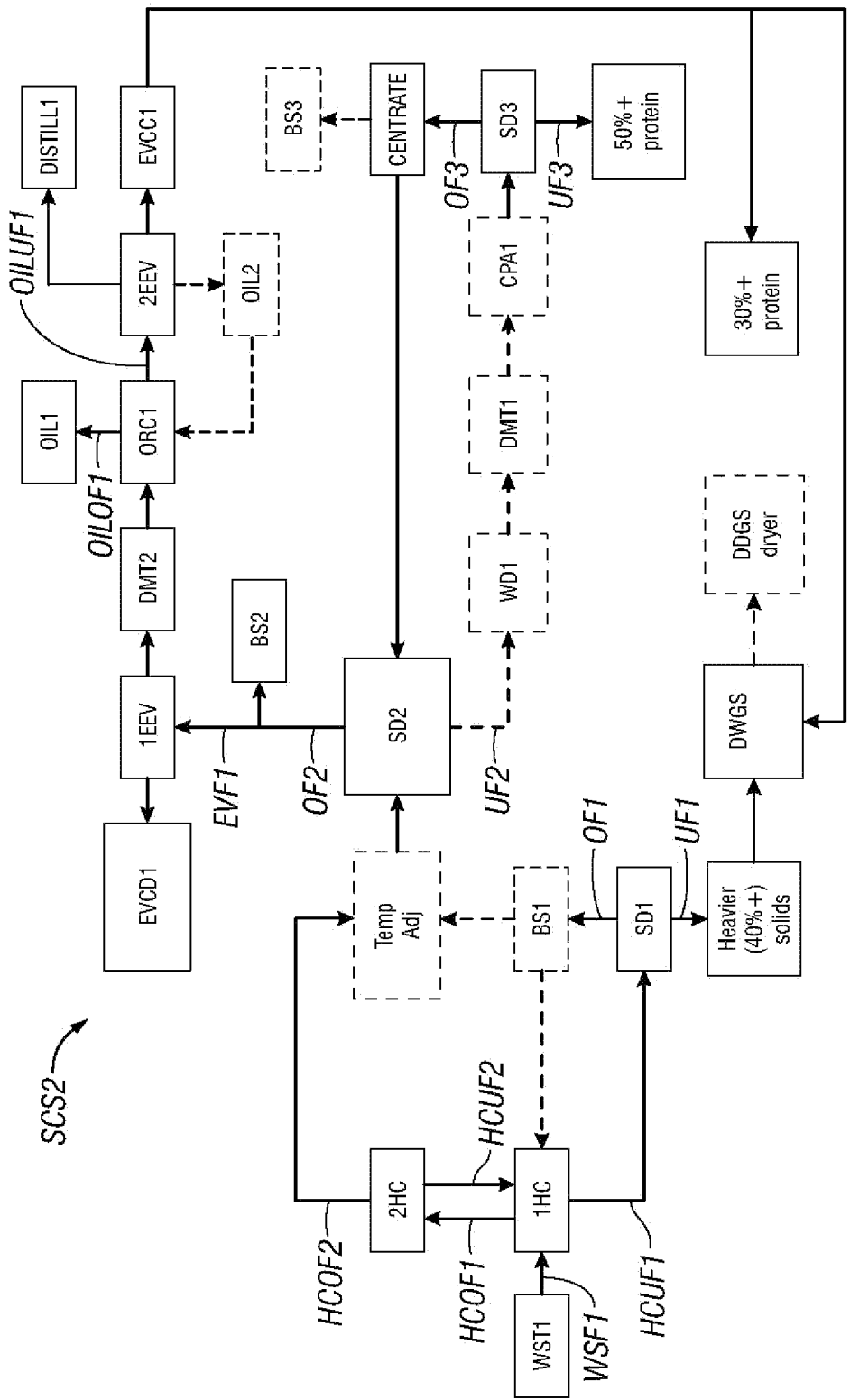
FIG. 9 shows a schematic view of another stillage clarification system, according to some aspects of the present disclosure.

As shown in FIG. 9, yet another stillage clarification system SCS2 is shown wherein an additional hydrocyclone 2HC is added downstream the original hydrocyclone 1HC and upstream of the separation device SD1.

In the embodiment shown, the underflow from the first hydrocyclone 1HC travels to a first separation device SD1. The overflow from a first hydrocyclone 1HC serves as the feed to a second hydrocyclone 2HC. The underflow from the second hydrocyclone HCUF2 may be recycled back to the first hydrocyclone 1HC.

This recycles the fine fiber particles into the first hydrocyclone 1HC allowing for the preferential recovery of these fiber particles into process stream HCUF1. The overflow HCOF2 from the second hydrocyclone 2HC, in comparison to the feed (i.e., HCOF1) to the second hydrocyclone 2HC, may be further enriched in water, protein and oil, further depleted in fiber.

Just like the overflow HCOF1 feeding the second separation device SD2 in the stillage clarification system SCS1 of FIG. 5, the overflow HCOF2 feeding the second separation device SD2 can be treated with increased or decreased temperature. Furthermore, each of the components in the stillage clarification system SCS2 of FIG. 9 that are downstream of the first and second separation devices SD1, SD2 can, preferably, remain the same as the stillage clarification system SCS1 of FIG. 5. The stillage clarification system SCS2 of FIG. 9 thus accomplishes similar objectives but with even more pronounced advantages due to the inclusion of another hydrocyclone 2HC.

Figure 10:
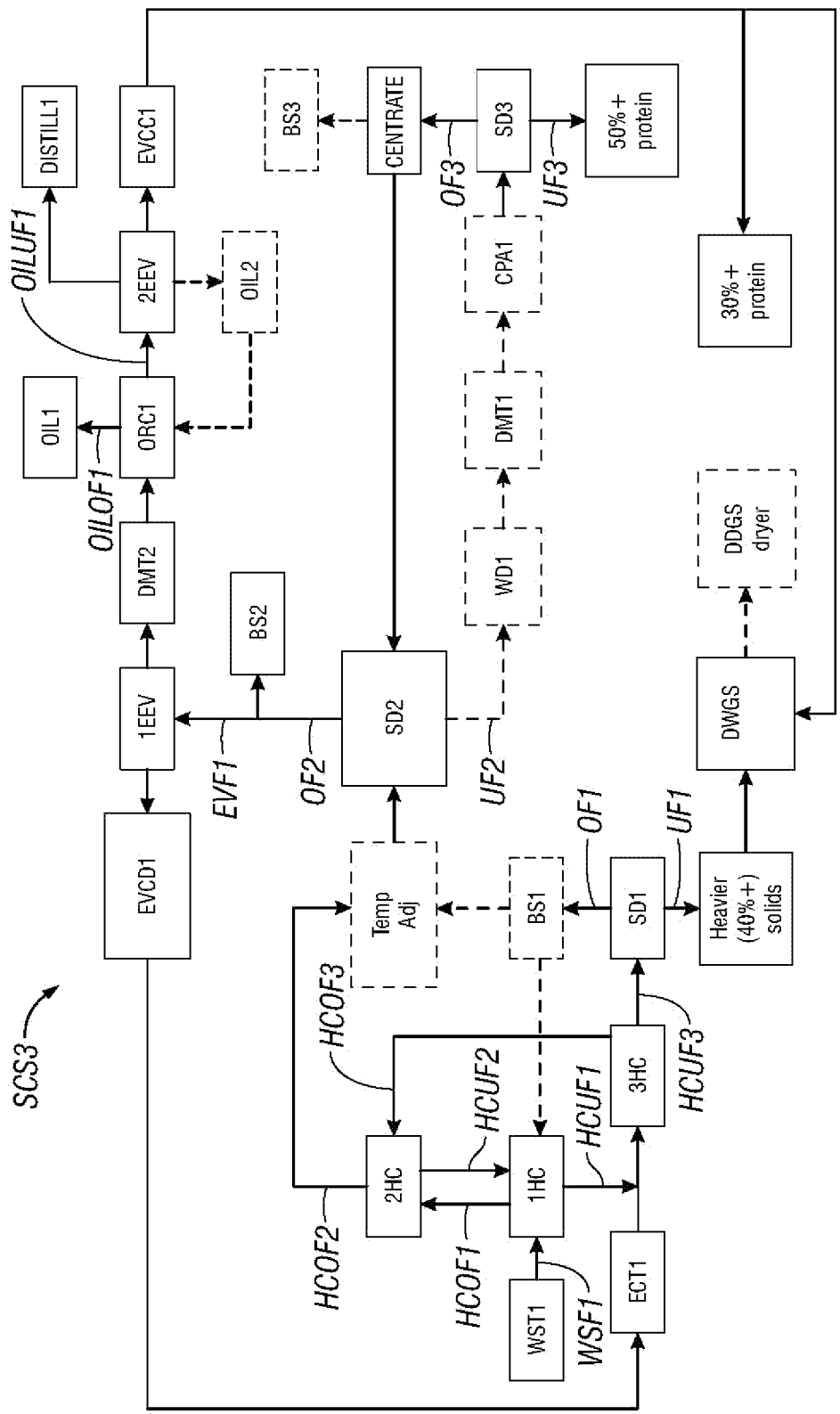
FIG. 10 shows a schematic view of yet another stillage clarification system, according to some aspects of the present disclosure.

As shown in FIG. 10, yet another stillage clarification system SCS3 is shown wherein yet another additional hydrocyclone 3HC is added downstream the first hydrocyclone 1HC, upstream of the separation device SD1, and upstream the second hydrocyclone 2HC. It should be appreciated at this point that any number of hydrocyclones could be added to the stillage clarification system in a cascading manner to improve the theoretical efficiency of the system, however doing so results in diminishing marginal returns.

Figure 18:
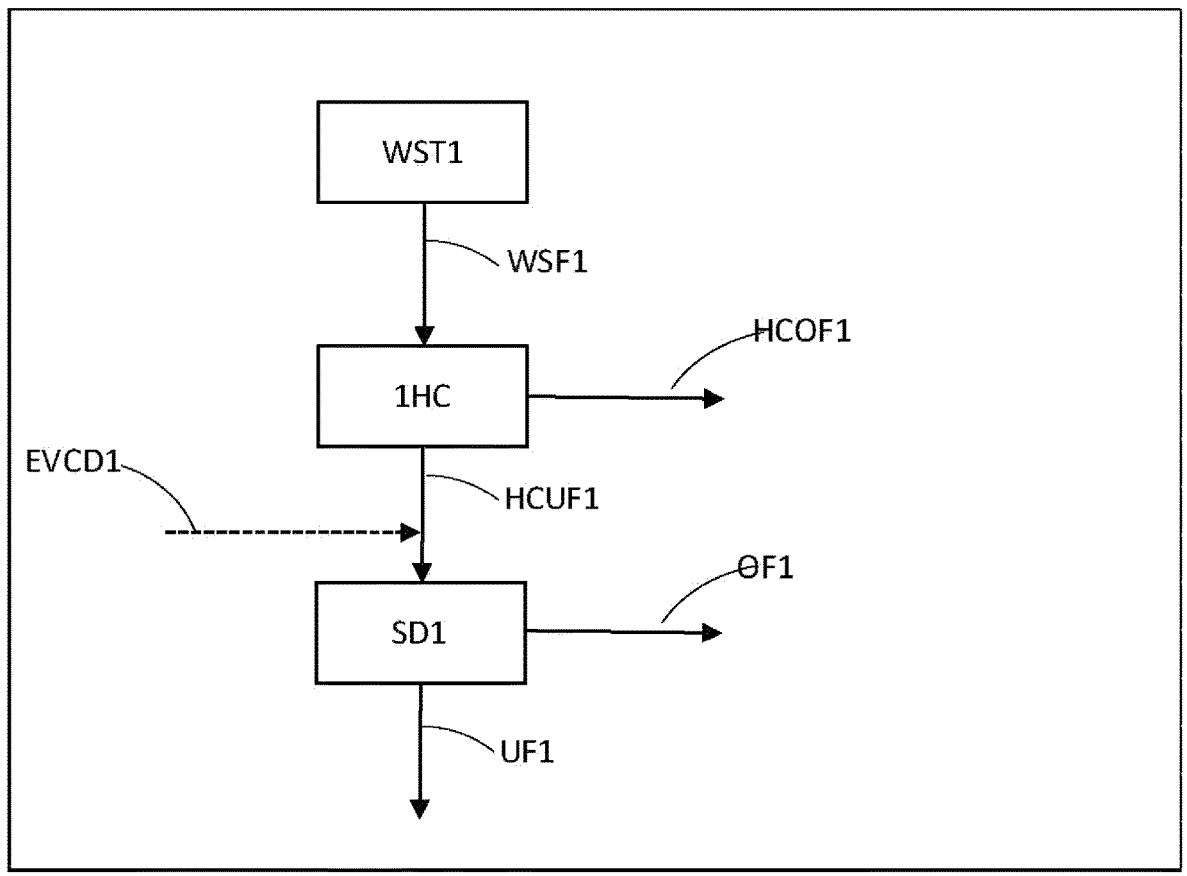
FIG. 18 shows the flow chart of experiments comparing the effects of further treating hydrocyclone underflow with a suitable wash water such as evaporator condensate.

An experiment according to the flow chart of FIG. 18 was conducted at bench scale, expressly charged, treated and collected batchwise at gravitational forces multiplied by time typical of commercial scale hydrocyclones [1HC], in the range of about 1,250-2,250 g-secs [i.e., 150 times gravity for up to 15 seconds; ranging to 250 times gravity for up to 5 seconds], to compare the effects on OF1 and UF1 of optionally including a washing step to HCUF1, in this example using 3 parts of evaporator condensate EVCD1 per 1 part HCUF1.

Table 6 arising from this experiment shows the effect of suitable wash water, such as evaporator condensate EVCD1, when added to the underflow HCUF1 to allow the wash of additional protein and/or oil away from the fiber enriched underflow in SD1.

TABLE 6

| Description | % crude fiber | % crude fat | % crude protein |
|---|---|---|---|
| UF1 [no wash] | 8.63% | 11.87% | 29.85% |
| UF1 [post 3:1 EVDC1 wash] | 9.30% | 6.49% | 30.89% |

The process of using a suitable wash water EVCD1 clearly reduces the final oil/fat content in UF1 recovered from SD1, permitting subsequent production of reduced fat DDG &/or DDGS in the DDGS Dryer. At the same time eluted oil may be returned to the process and may be subsequently captured as additional distillers corn oil OIL1.

Table 7 arising from this same experiment show the effect of suitable wash water, such as evaporator condensate EVCD1, when added to the underflow HCUF1 to allow the wash of additional protein and/or oil into the overflow OF1 of SD1.

TABLE 7

| Description | % DM | % crude fat | % crude protein |
|---|---|---|---|
| OF1 [no wash] | 4.05% | 12.28% | 30.39% |
| OF1 [+3:1 EVDC1 wash] | 1.86% | 6.49% | 30.50% |

The volumetric and/or mass flow rate fed into SD1 in the 3:1 EVCD1 wash experiment is self-evidently 4 times higher than the experiment the base case that received no wash. This additional flow rate mostly moves into the overflow OF1 of SD1. That is to say in Table 7 that "OF1 [+3:1 EVDC1 wash]" has approximately 4 times the flow rate of "OF1 [no wash]". Therefore, it can be readily calculated the:

The total solids (i.e., DM) flow rate into OF1 may be about 1.8 times higher on a dry matter basis The crude fat flow rate into OF1 may be about 2.1 times higher on dry matter basis & thereby clearly further depleting the second fraction of fat The crude protein flow rate into OF1 may be about 4.0 times higher on a dry matter basis & thereby clearly further depleting the second fraction of protein The process of using a suitable wash water EVCD1 clearly reduces the final oil/fat content in UF1 recovered from SD1, permitting subsequent production of reduced fat DDG &/or DDGS in the DDGS Dryer. At the same time eluted oil is returned to the process and may be subsequently captured as additional distillers corn oil OIL1.

More particularly, suitable wash water, such as evaporator condensate EVCD1, may be added to the underflow HCUF1 to dilute and allow the wash of additional protein and oil away from fibrous materials. The diluted underflow flow may be directed to and serve as feed for the third hydrocyclone 3HC. The third hydrocyclone 3HC is operated such that, in comparison to the feed, the underflow HCUF3 is depleted in water, protein and oil, and enriched in fiber. The underflow HCUF3 is then fed to the first separation device SD1. Additionally, the overflow HCOF3 is, in comparison to the feed, the enriched in water, protein and oil, and depleted in fiber. The overflow HCOF3 from the third hydrocyclone 3HC may be combined with the overflow HCOF1 from the first hydrocyclone 1HC to form a feed that is then processed through the second hydrocyclone 2HC. The second hydrocyclone is operated such that, in comparison to the feed, the underflow HCUF2 from the second hydrocyclone 2HC is depleted in water, protein and oil, and enriched in fiber.

Just like the overflow HCOF2 feeding the second separation device SD2 in the stillage clarification system SCS2 of FIG. 9, the overflow HCOF2 feeding the second separation device SD2 can be treated with increased or decreased temperature. Furthermore, each of the components in the stillage clarification system SCS3 of FIG. 10 that are downstream of the first and second separation devices SD1, SD2 can, preferably, remain the same as the stillage clarification system SCS2 of FIG. 9. The stillage clarification system SCS3 of FIG. 10 thus accomplishes similar objectives but with even more pronounced advantages due to the inclusion of yet another hydrocyclone 3HC.

Figure 19:
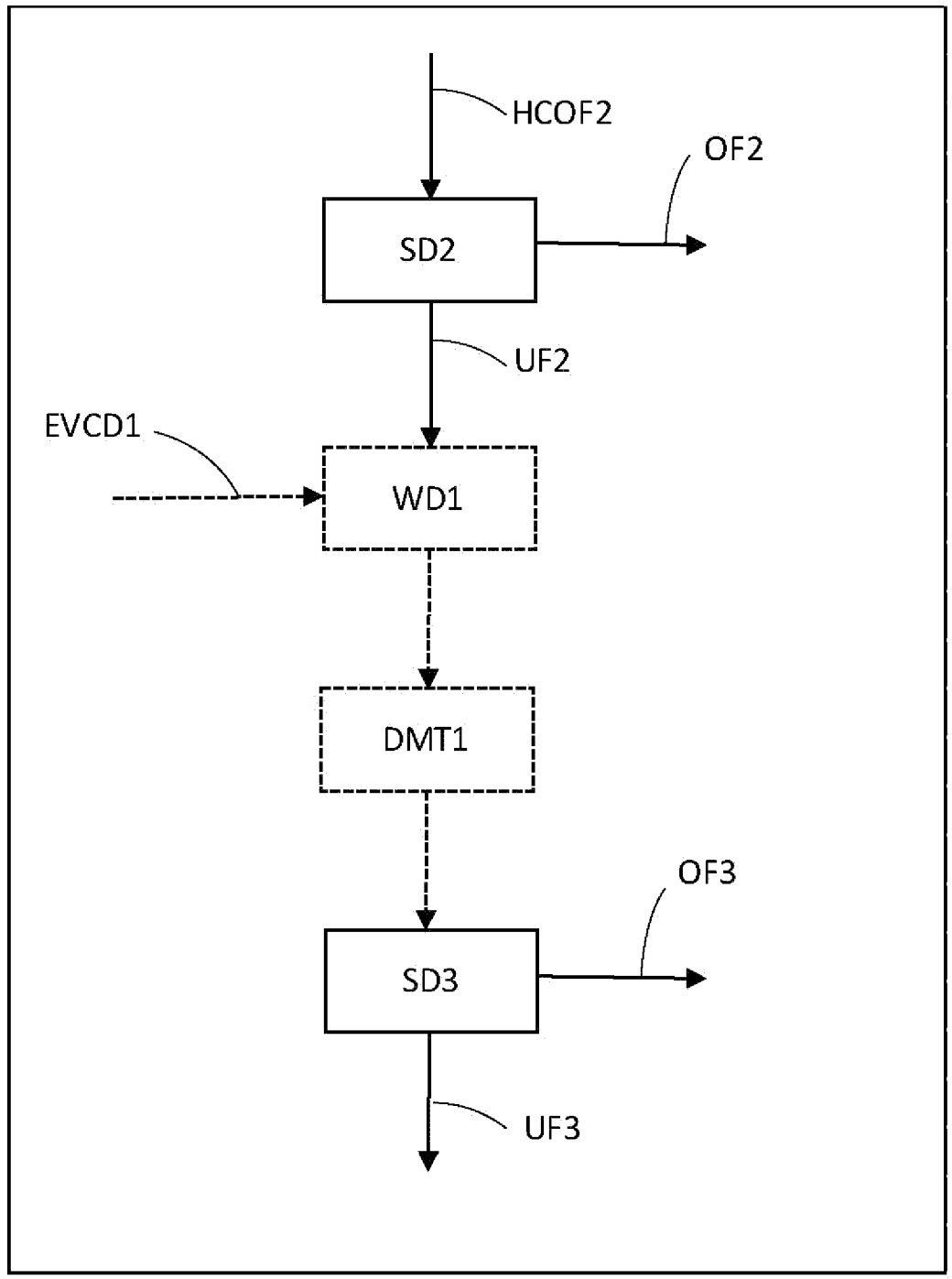
FIG. 19 shows the flow chart of experiments comparing the effects of further treating disk-centrifuge underflow with a suitable wash water such as condensate and/or with a suitable demulsifier such as polysorbate 80.

An experiment according to the flow chart of FIG. 19 below was conducted at pilot scale to compare the effects on UF3 of optionally including a washing step WD1 and/or a demulsifying treatment step DMT1 to UF2.

Table 8 arising from this experiment shows the effect of suitable washing WD1, such as with evaporator condensate EVCD1, when added to the underflow UF2 to allow the wash of additional oil and/or protein away from the protein enriched underflow UF3 in SD3.

TABLE 8

| Description | % DM | % crude protein | % crude fat | % crude ash |
|---|---|---|---|---|
| OF2 | 5.26% | 22.69% | 27.76% | 15.04% |
| UF2 | 31.91% | 64.37% | 4.74% | 3.59% |
| UF3 [post WD1 wash] - sample #1 | 28.54% | 67.43% | 2.28% | 2.76% |
| UF3 [post WD1 wash] - sample #2 | 26.22% | 67.73% | 2.61% | 2.46% |

The increase in protein purity in UF3, compared to UF2, is clearly observed in Table 8 due to the effect of suitable washing WD1.

Those skilled in the art shall be capable to optimize the protein purity improvement by such washing of a concentrated protein enriched stream.

Table 8 further shows the movement of insoluble solids by the two-phase disk centrifuge SD2, largely as protein, into UF2 as a principal factor in the observed reduction in total solids (% DM). The prior art teaches that successful removal of these insoluble solids, largely insoluble protein, from evaporator feed is the necessary to substantially the fouling of said evaporator feed stream and thereby allowing a larger operating temperature range within the evaporators. This disclosure presents a mathematical proof of the ability to thereby add at least third evaporator effect within this larger operating temperature range.

Table 9A arising from this experiment shows the effect of suitable washing WD1, such as with evaporator condensate EVCD1, and additionally demulsifier treatment DMT1, such as with polysorbate 80, when added to the underflow UF2 to allow the wash of additional oil and/or protein away from the protein enriched underflow UF3 in SD3.

TABLE 9A

| Description | % DM | % crude protein | % crude fat | % crude ash |
|---|---|---|---|---|
| UF2 | 14.93% | 62.74% | 8.26% | 4.48% |
| UF3 [post WD1 wash + DMT1] - sample #1 | 25.19% | 67.77% | 3.33% | 3.56% |
| UF3 [post WD1 wash + DMT1] - sample #2 | 25.24% | 70.11% | 2.86% | 2.63% |

The increase in protein purity in UF3, compared to UF2, is clearly observed in Table 9A, due to the effect of suitable washing WD1 combined with suitable demulsifier treatment DMT1.

Table 9B was conducted under a different plant equilibrium and as variant to Tables 8 and 9A, specifically via the demulsifier treatment DMT1 being prior to SD2. Again, we show the effect of suitable washing WD1, such as with evaporator condensate EVCD1, when added to the underflow UF2 to allow the wash of additional oil and/or protein away from the protein enriched underflow UF3 in SD3. The uplift in protein purity is similar to the method in Table 9, due the combination of DMT1 and WD1.

Further it is apparent the increase in protein purity in UF3, compared to UF2, is larger in Tables 9A & 9B compared to Table 8. Thereby the combination of treatments, WD1 and DMT1, clearly can achieve a greater increase in protein purity than WD1 alone.

Our preferred embodiment involves performing DMT1 on the concentrated UF2, being of smaller volumetric flow rate, more concentrated in suspended solids, and thereby more expedient to achieve an effective demulsifier treatment DMT1, utilizing a minimum of demulsifier and comfortably below GRAS limits for the products.

Figure 11:
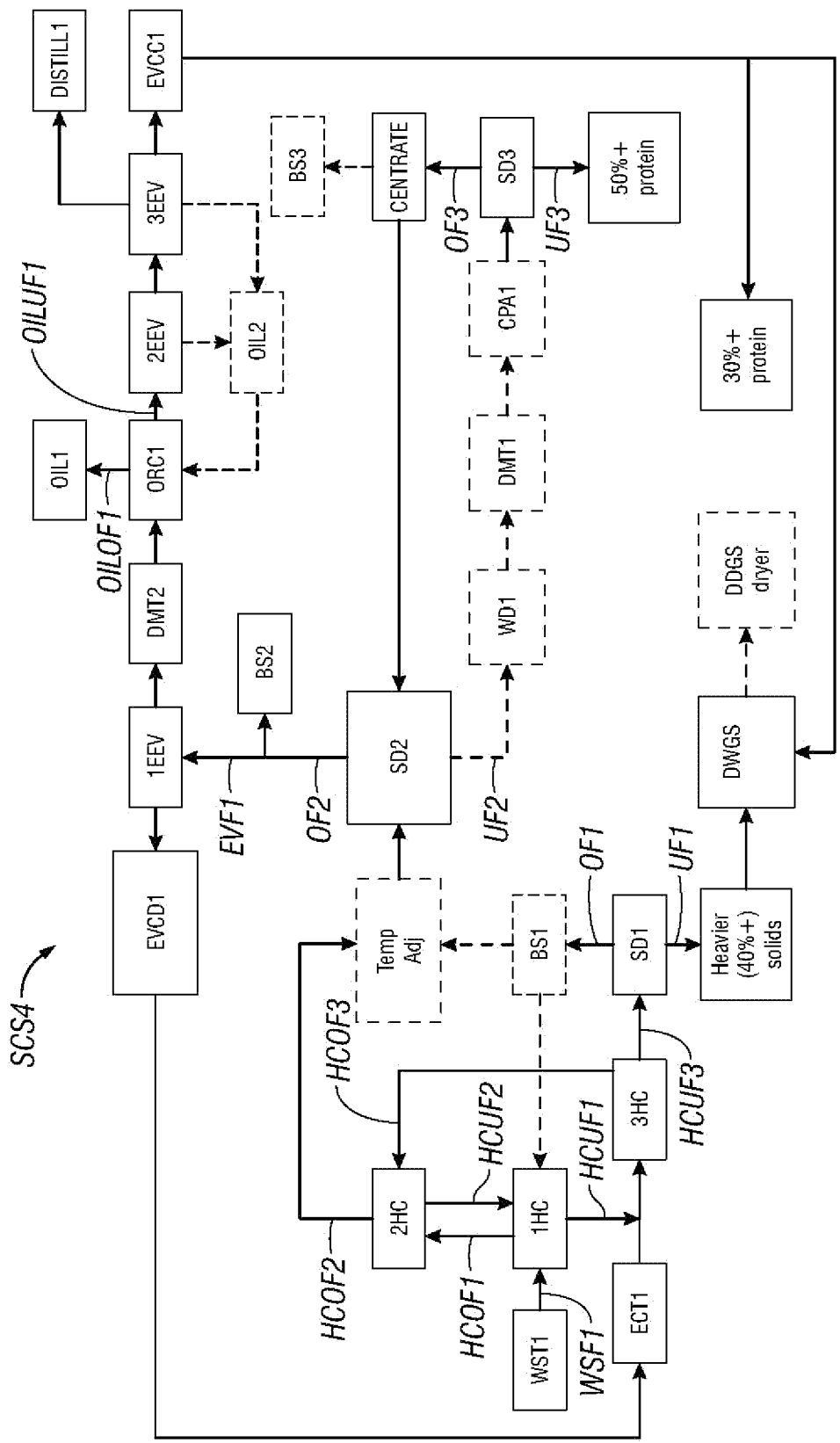
FIG. 11 shows a schematic view of yet another stillage clarification system, according to some aspects of the present disclosure.

As shown in FIG. 11, yet another stillage clarification system SCS4 is shown wherein yet another evaporator 3EEV is used. As noted above, after emulsion concentrate and/or oil OIL1 recovery, the underflow from the oil recovery centrifuge ORC1 is returned, if desired, to final evaporation stages. In the embodiment shown in FIG. 11, a third evaporator 3EEV is added downstream of the second effect evaporator 2EEV and upstream of the distillation DISTILL1 or other useful location(s) for energy deposit for energy integration and energy recovery.

Additionally, the second effect evaporator 2EEV may be configured to recycle evaporator condensate EVCD1 into the evaporator condensate tank ECT1 before being combined with the underflow HCUF1 to form feed for the third hydrocyclone 3HC.

Concentrate from the second effect evaporator 2EEV may be taken to the third effect evaporator 3EEV. Using the third effect evaporator 3EEV reduces the amount of energy required for evaporation while also reducing the amount of dirty backset sent to the ethanol plant. The unusually low fouling nature of the thin stillage in the current invention allows the use of three or more evaporator effects. The use of three or more evaporator effects is particularly useful in ethanol plants that recover the thermal energy in the evaporator vapor to the distillation process, such as is common with the ICM and other ethanol plant designs. Evaporator concentrate can achieve very high solids with about 50% to 85% dry solids possible due to low suspended solids in the evaporator feed.

Vapors VP1 from the remaining the evaporation process, i.e., from the third effect evaporator 3EEV, are taken to distillation DISTILL1 or other useful location(s) for energy deposit for energy integration and energy recovery.

Optionally, oil OIL2 can be recovered from the second effect evaporator 2EEV and/or the third effect evaporator 3EEV and recycled back into the feed for the oil and/or emulsion recovery centrifuge ORC1 such that the oil may be salvaged later as OIL1.

Figure 3:
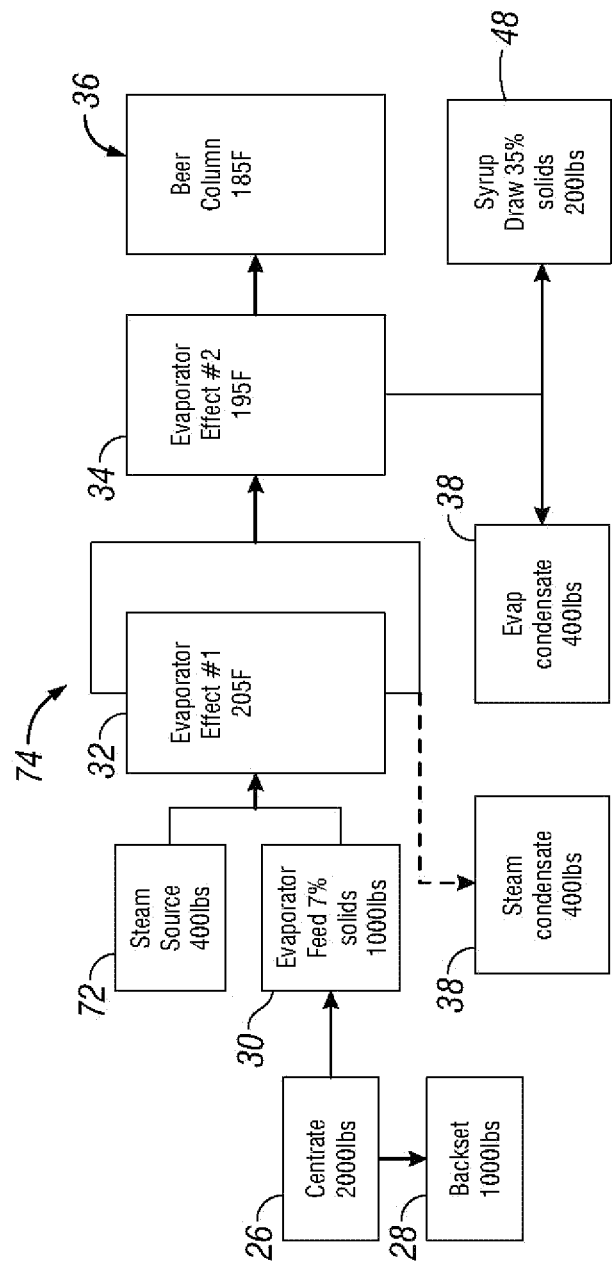
FIG. 3 shows a schematic view of a common two effect evaporator plus reduced pressure beer column energy cascade, according to some aspects of the present disclosure.
Figure 4:
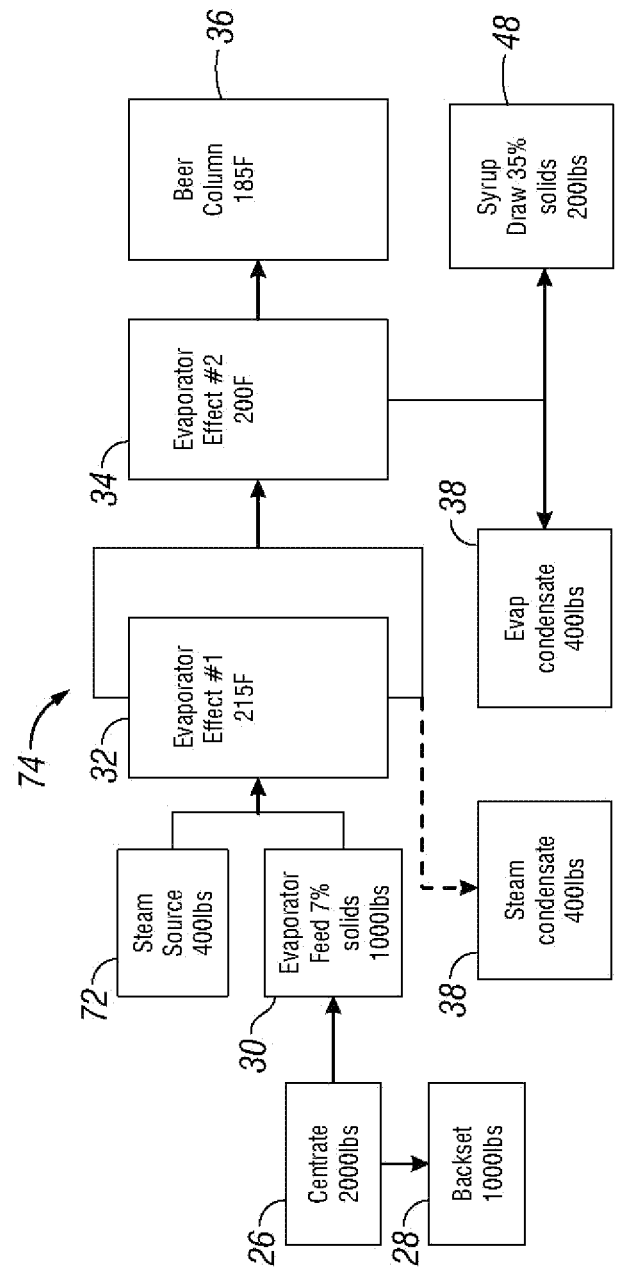
FIG. 4 shows a schematic view of a common two effect evaporator plus reduced pressure beer column energy cascade with moderate heat exchange surface fouling (for example, tube fouling).

The examples of FIGS. 12-18 exemplify reduced fouling effect evaporators due, in accordance with some aspects of the present disclosure. These examples are similar to the examples of FIGS. 3 and 4 in that the centrate flow OF2 may be a constant approximately 2000 pounds per minute (lbs/min). This flow rate can be adjusted for any individual plant running such a process and the flows throughout the system may decrease/increase proportionally. Similarly, it will be assumed low pressure beer columns often operate at a desired temperature of approximately 185° F. at the bottom of the column to get sufficient stripping of ethanol in the beer. While this temperature could be higher or lower, the temperature may be kept constant so as to be able to compare each of the different examples. The operating pressure may be approximately 8.31 pounds per square inch absolute (steam saturation pressure at 185° F.).

Figure 12:
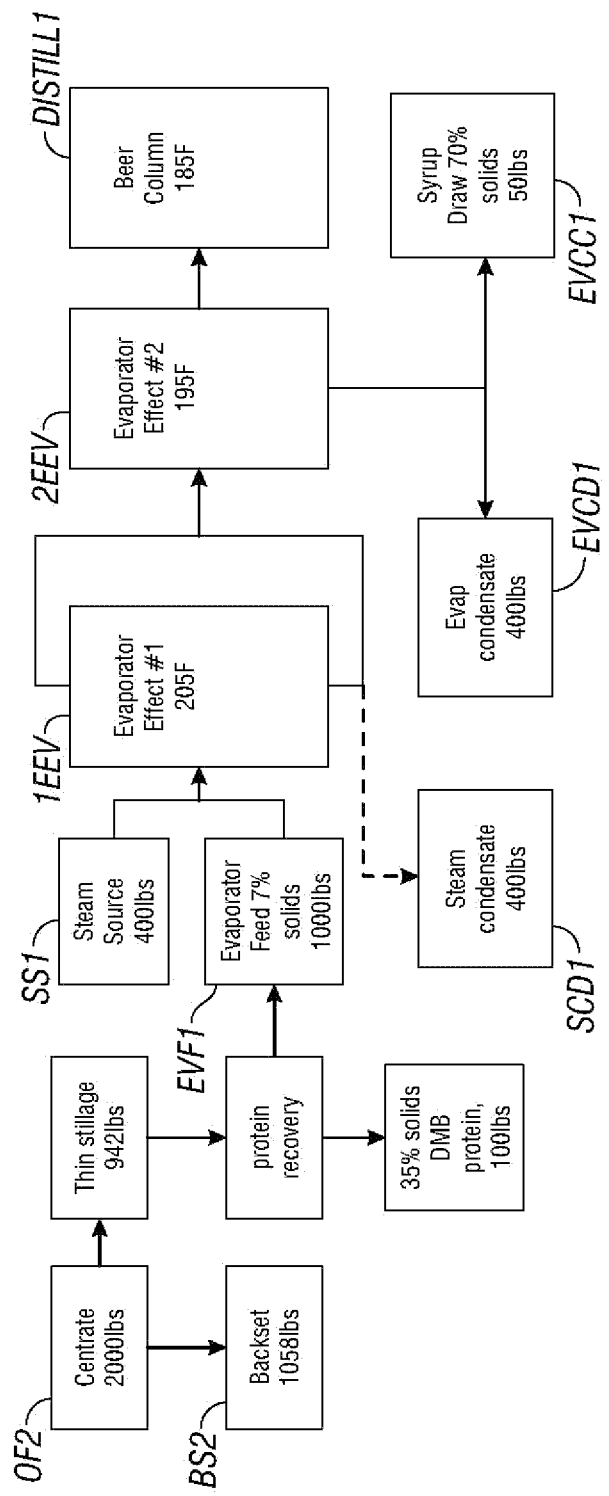
FIG. 12 shows a reduced fouling evaporator feed product feeding a two-effect evaporator plus reduced pressure beer column energy cascade, according to some aspects of the present disclosure.

FIG. 12 exemplifies a standard two effect falling film evaporator with thermal exhaust energy from the second effect evaporator 2EEV driving a reduced pressure beer stripping column and running on reduced solid thin stillage that have had the majority of the suspended solids removed by a mechanical device, such as SD2 (e.g. the total solids content in the thin stillage may be about 3.7%, rather than the standard 7.0%).

Centrate OF2 from a disk-type centrifuge acting as a preferred embodiment of SD2 may be split into approximately 53% mass flow to backset BS2 and approximately 47% mass flow to evaporation feed EVF1. In this example, the thin stillage feeding the evaporator has been produced using the teachings provided by the present disclosure and contains about 3.7% total solids. Protein rich solids have been removed at about a 35% DMB concentration, though it is evident to one skilled in the art that this DMB can be higher or lower. About 842 gpm of the reduced fouling thin stillage may be directed to the two-effect evaporator.

A steam source SS1 may be directed to the shell side of the first effect evaporator 1EEV. The steam condenses on the tubes transferring the latent heat energy of condensation to the liquid inside the tubes (as particularly shown in FIG. 7). The liquid traveling through the tubes boils creating steam. This steam may be directed to the second effect evaporator 2EEV. A first approximation shows that for every mass unit of steam condensed on the evaporator tubes one mass unit of water boils in the evaporator creating one mass unit of steam vapor to be produced and leave the evaporator. The steam produced in the first effect evaporator 1EEV may be directed to the shell side of the second effect evaporator 2EEV and condenses to transfer energy to the liquid in the tubes. The condensed liquid, termed process condensate or evaporator condensate EVD1, may be withdrawn from the shell side of the second effect evaporator 2EEV. In this example, the evaporator condensate flow may be about 400 pounds per minute (lbs/min).

The steam produced in the second effect evaporator 2EEV may be directed to the beer column for distillation DISTILL1. The syrup (CCDS) draw from this operation may be approximately 50 lbs/min at about 70% solids, DMB.

The example of FIG. 12 shows a standard, well running system with reduced fouling thin stillage. Note that the temperature in the first effect evaporator 1EEV may be about 205° F., the second effect evaporator 2EEV may be about 195° F., and the beer column temperature may be about 185° F.

Figure 13:
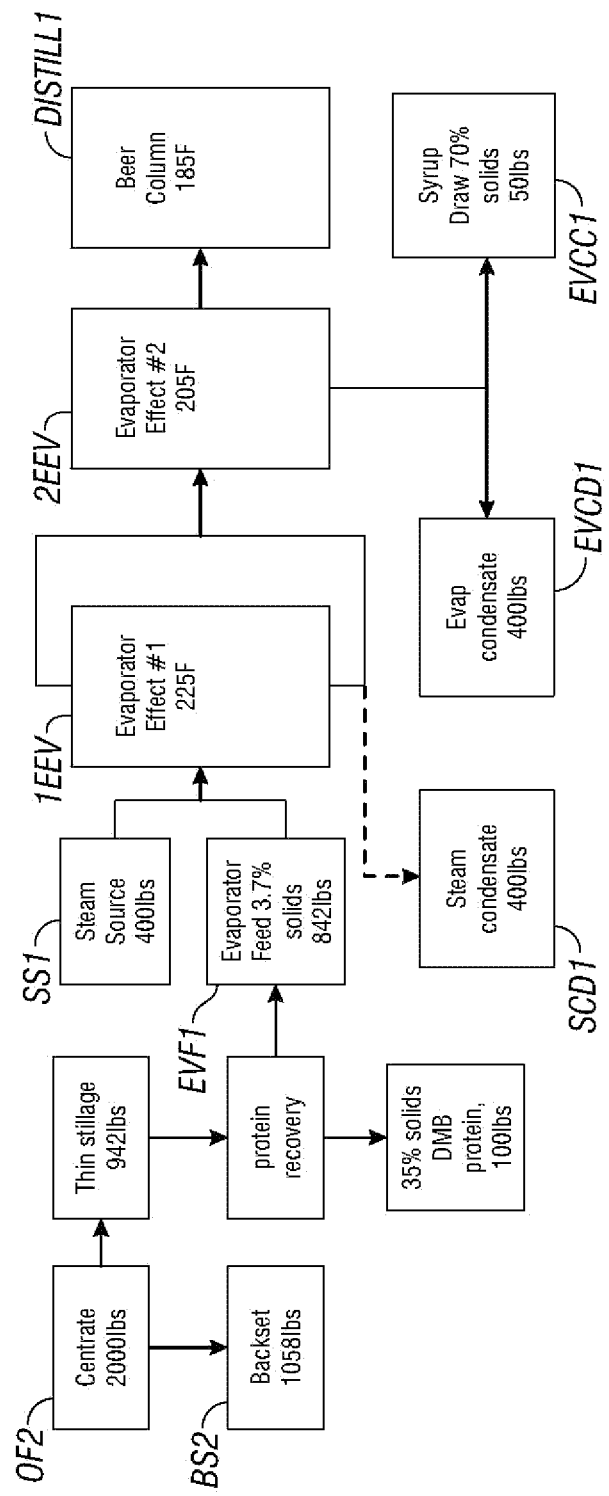
FIG. 13 shows a reduced fouling evaporator feed product feeding a two-effect evaporator plus reduced pressure beer column energy cascade with slight heat exchange surface fouling (for example, tube fouling), according to some aspects of the present disclosure.

FIG. 13 exemplifies the exact same configuration of FIG. 12 but represents a system that has been running for a longer period of time in a manner such that it is undergoing slight fouling. The example of FIG. 13 differs from the example of FIG. 4 in that the example of FIG. 13 still has yet to uncontrollably foul and is stable above a temperature of about 215° F. (the temperature of the figure being at least 225° F.). These elevated temperatures, particularly on the first effect evaporator 1EEV, are normally a problem for operations because the fouling tends to continue to escalate.

Given the reduced fouling potential of the reduced suspended solids thin stillage, it is indeed possible to increase the throughput of an existing evaporator system by intentionally raising the temperature of the first effect evaporator 1EEV and the second effect evaporator 2EEV. This increases the temperature differential between the shell side and the temperature inside the tubes. This increased differential increases the rate of heat transfer into the fluid in the tubes resulting in additional productivity per unit time. This increased throughput is a substantial advantage to producers for higher productivity with the same physical asset.

Figure 14:
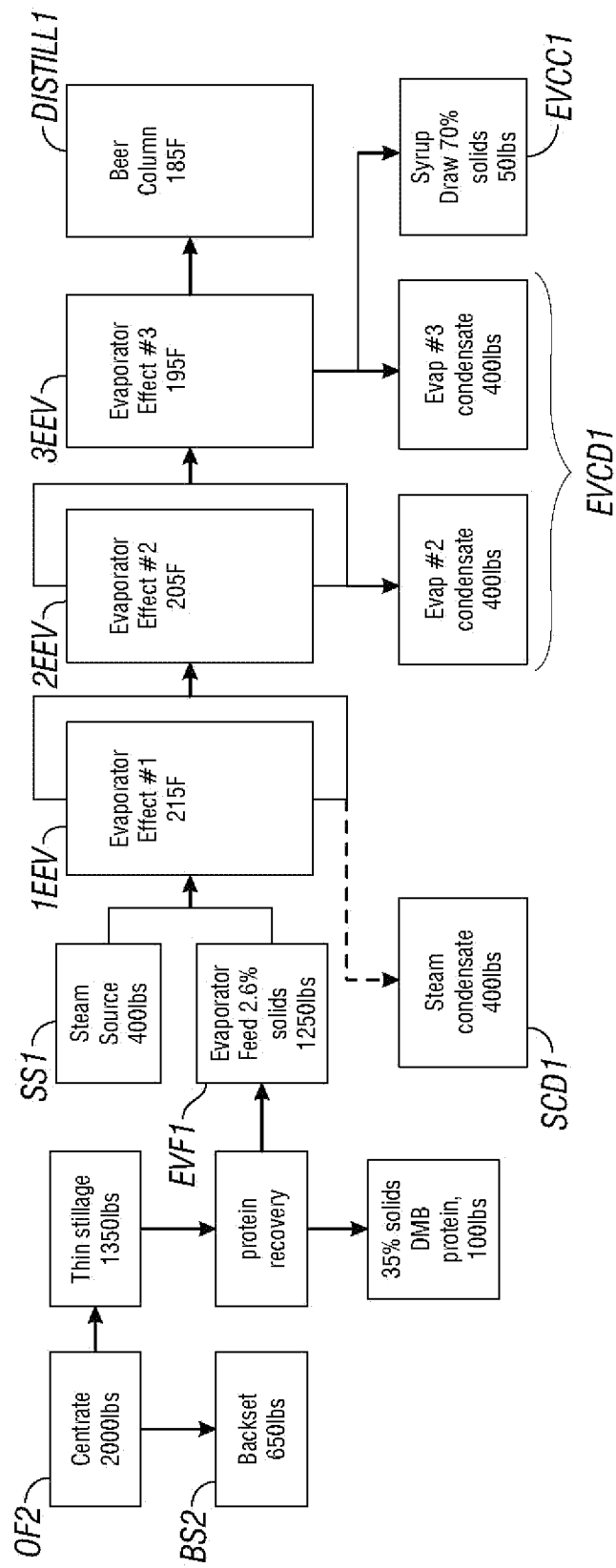
FIG. 14 shows a reduced fouling evaporator feed product feeding a three-effect evaporator plus reduced pressure beer column energy cascade, according to some aspects of the present disclosure.

FIG. 14 exemplifies a three-effect falling film evaporator with thermal exhaust energy from the third effect evaporator 3EEV driving a reduced pressure beer stripping column and running on reduced solid thin stillage (e.g. the total solids content in the thin stillage used may be about 2.6%, rather than the standard 7.0%). The use of an additional evaporator allows the total solids content in the thin stillage to be lower, in part due to how the evaporator is able to recycle water, i.e., the total solids content in the thin stillage is lower because the total solids content asymptotically approaches a number that depends on (a) how much evaporator condensate EVCD1 can be recycled and (b) the solids content of the original whole stillage to be processed by the system.

Centrate OF2 from a disk-type centrifuge SD2 may be split into approximately 38% mass flow to backset BS2 and approximately 62% mass flow to evaporation feed EVF1. In this example, the centrate OF2 has been produced from the teachings of the present disclosure and contains about 2.6% total solids. Thus, about 1244 gpm of the reduced fouling thin stillage may be directed to the three-effect evaporator. Note that the freshly produced steam required for this three-effect evaporator is almost identical as that required for a two-effect evaporator.

The example of FIG. 14 differs from the example of FIG. 12 in that the evaporator condensate flow may now be about 800 pounds per minute (lbs/min). This increase in clean process condensate EVD1 results in less backset as well as more opportunity for washing impurities out of the high fiber feed and the high protein feed disclosed in this invention. This example shows a standard, well running system with reduced fouling thin stillage. Note that the temperature in the first effect evaporator 1EEV may be about 215° F., the second effect evaporator 2EEV may be about 205° F., the third effect evaporator 3EEV may be about 195° F., and the beer column temperature may be about 185° F.

Figure 15:
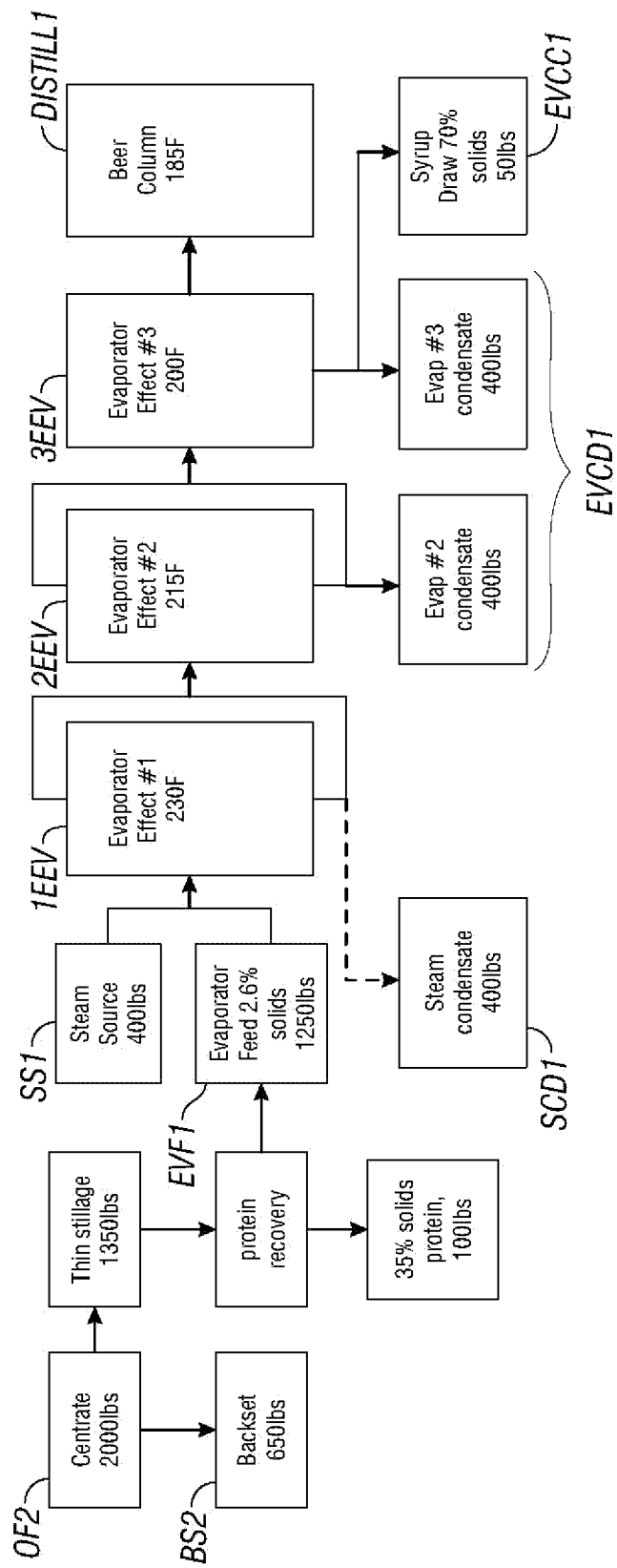
FIG. 15 shows a reduced fouling evaporator feed product feeding a three-effect evaporator plus reduced pressure beer column energy cascade with slight heat exchange surface fouling (for example, tube fouling), according to some aspects of the present disclosure.

FIG. 15 exemplifies the exact same configuration of FIG. 14 but represents a system that has been running for a longer period of time and undergoing slight fouling. The example of FIG. 15 differs from the example of FIG. 4 in that the example of FIG. 15 still has yet to uncontrollably foul and is stable above a temperature of about 215° F. Note that the temperature in the first effect evaporator 1EEV may be about 230° F., the second effect evaporator 2EEV may be about 215° F., the third effect evaporator 3EEV may be about 200° F., and the beer column temperature may be about 185° F. Due to the reduced fouling at elevated temperatures with the low solids thin stillage, as taught by the present disclosure, the operation of this system is not critical and can be cleaned easier than a traditional thin stillage evaporator feed EVF1.

Figure 16:
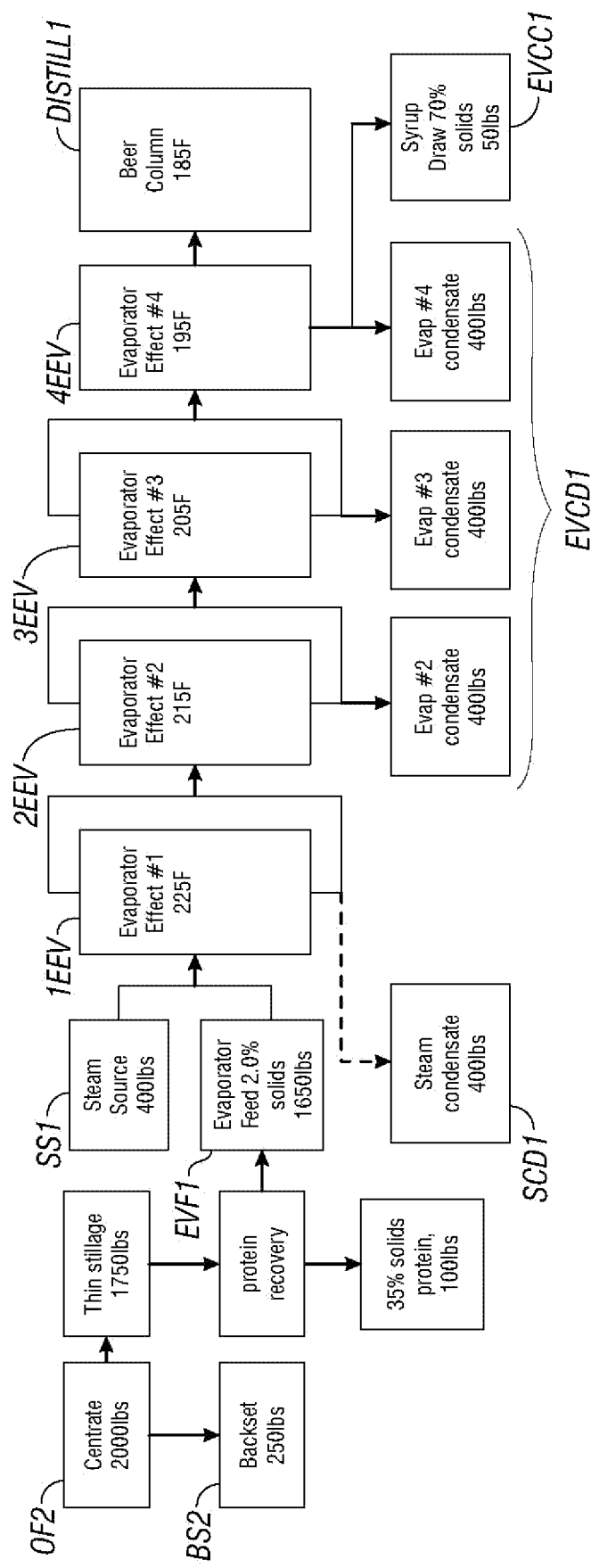
FIG. 16 shows a reduced fouling evaporator feed product feeding a four-effect evaporator plus reduced pressure beer column energy cascade, according to some aspects of the present disclosure.

FIG. 16 exemplifies a four-effect falling film evaporator with thermal exhaust energy from the fourth effect evaporator 4EEV driving a reduced pressure beer stripping column and running on reduced solid thin stillage (e.g. the total solids content in the thin stillage used may be about 2.0%, rather than the standard 7.0%).

Centrate OF2 from a disk-type centrifuge SD2 may be split into approximately 12% mass flow to backset BS2 and approximately 88% mass flow to evaporation feed EVF1. In this example, the centrate OF2 has been produced from the teachings of the present disclosure and contains about 2.0% total solids. Thus, about 1650 gpm of the reduced fouling thin stillage may be directed to the four-effect evaporator. Note that the steam required for this four-effect evaporator is almost identical as that required for a two- or three-effect evaporator.

The example of FIG. 16 differs from the example of FIG. 14 in that the evaporator condensate flow may now be about 1200 pounds per minute (lbs/min). This increase in clean process condensate results in less backset as well as more condensate water flow for additional opportunity for washing impurities out of the high fiber feed and the high protein feed disclosed in this invention. This example shows a standard, well running system with reduced fouling thin stillage. Note that the temperature in the first effect evaporator 1EEV may be about 225° F., the second effect evaporator 2EEV may be about 215° F., the third effect evaporator 3EEV may be about 205° F., the fourth effect evaporator 4EEV may be about 195° F., and the beer column temperature may be about 185° F.

Figure 17:
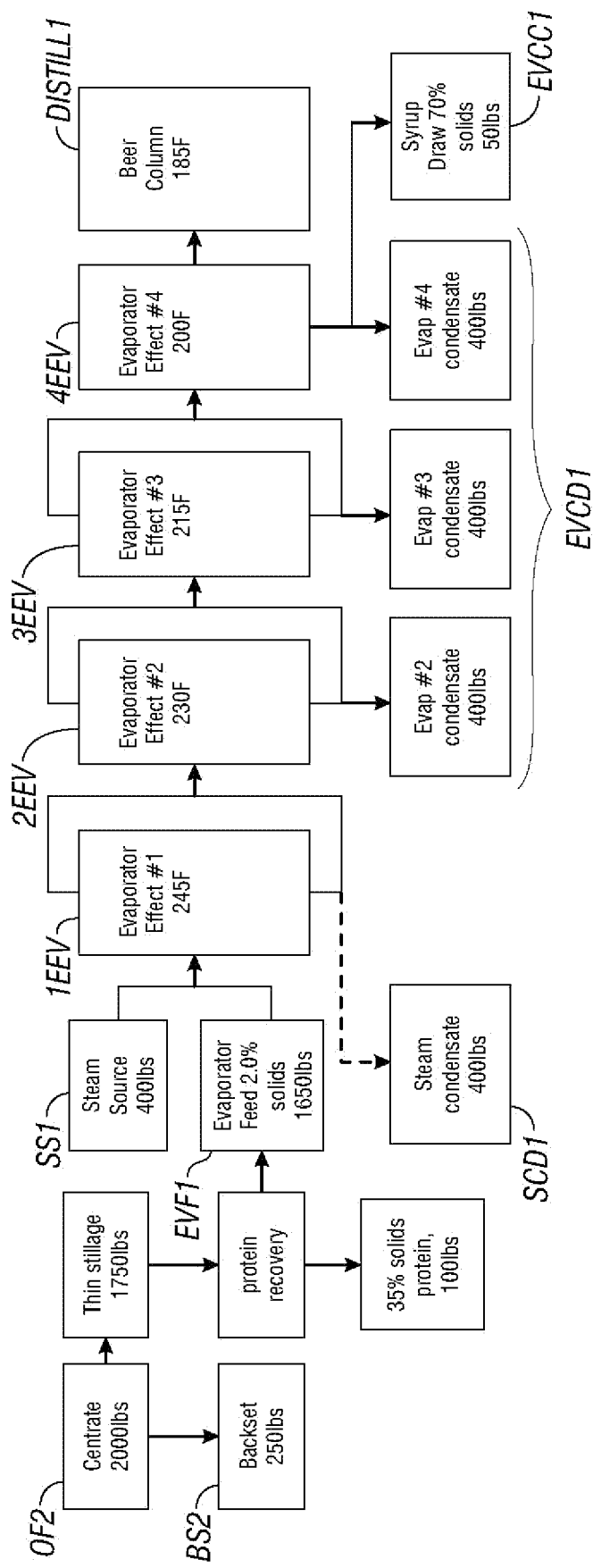
FIG. 17 shows a reduced fouling evaporator feed product feeding a four-effect evaporator plus reduced pressure beer column energy cascade with moderate heat exchange surface fouling (for example, tube fouling), according to some aspects of the present disclosure.

FIG. 17 exemplifies the exact same configuration of FIG. 16 but represents a system that has been running for a longer period of time and undergoing slight fouling. The example of FIG. 17 differs from the example of FIG. 4 in that the example of FIG. 17 still has yet to uncontrollably foul and is stable above a temperature of about 215° F. Note that the temperature in the first effect evaporator 1EEV may be about 245° F., the second effect evaporator 2EEV may be about 230° F., the third effect evaporator 3EEV may be about 215° F., the fourth effect evaporator 4EEV may be about 200° F., and the beer column temperature may be about 185° F. Due to the reduced fouling at elevated temperatures with the low solids thin stillage, as taught by the present disclosure, the operation of this system is not critical and can be cleaned easier than a traditional thin stillage evaporator feed EVF1.

From the foregoing, it can be seen that the present invention accomplishes at least all of the stated objectives.

LIST OF REFERENCE NUMERALS

The following list of reference numerals will be provided to facilitate an understanding and examination of the present disclosure and is not exhaustive. Provided it is possible to do so, elements identified by a numeral may be replaced or used in combination with any elements identified by a separate numeral. Additionally, numerals are not limited to the descriptors provided herein and include equivalent structures and other objects possessing the same function.

20 whole stillage
22 two-phase decanting centrifuge
24 underflow
26 overflow
28 backset
30 evaporator feed
32 first effect evaporator
34 second effect evaporator
36 distillation process
38 evaporator condensate
40 CCDS
42 oil recovery centrifuge
44 oil
46 syrup stream
48 de-oiled syrup
50 heavy solids
52 DWGS
54 DDGS dryer
56 additional evaporator
58 bowl
60 scroll/conveyer
62 main bearings
64 feed/slurry
66 solids discharge
68 liquid discharge
72 steam source
74 two effect falling film evaporator
1EEV first effect evaporator
2EEV second effect evaporator
3EEV third effect evaporator
4EEV fourth effect evaporator
1HC first hydrocyclone
2HC second hydrocyclone
3HC third hydrocyclone
BS1 first backset (mash bill recipe)
BS2 second backset (mash bill recipe)
BS3 third backset (mash bill recipe)
CPA1 addition of coagulation aids/polymers
DCO/E1 DCO/emulsion processing system
DDG distillers dry grains
DDGS distillers dry grains with solubles
DDG Dryer—dryer for distillers dry grains
DDGS Dryer—dryer for distillers dry grains with solubles
DMT1 first demulsifier treatment
DMT2 second demulsifier treatment
DISTILL1 distillation process(es)
DWG distillers wet grains
DWGS distillers wet grains with solubles
EV exemplary evaporator
EV01 shell cover
EV02 shell (tubes within)
EV03 bottom separator
EV04 skirt
EV05 liquid inlet
EV06 steam vent
EV07 steam inlet
EV08 condensate outlet
EV09 window
EV10 vapor outlet
EV11 liquid outlet
EVCC1 evaporator concentrate
EVCD1 evaporator condensate
EVF1 evaporator feed
gpm gallons per minute
HC exemplary hydrocyclone
HC01 upper portion
HC02 lower portion
HC03 union
HC04 feed inlet
HC05 overflow outlet
HC06 underflow outlet
HCOF1 first hydrocyclone overflow
HCOF2 second hydrocyclone overflow
HCOF3 third hydrocyclone overflow
HCUF1 first hydrocyclone underflow
HCUF2 second hydrocyclone underflow
HCUF3 third hydrocyclone underflow
OF1 first separation device overflow
OF2 second separation device overflow
OF3 third separation device overflow
OIL1 emulsion concentrate and/or oil (e.g. saleable oil)
OIL2 recovered oil
OILOF1 oil recovery centrifuge overflow
OILUF1 oil recovery centrifuge underflow
ORC1 oil recovery centrifuge
SCS1 first stillage clarification system
SCS2 second stillage clarification system
SCS3 third stillage clarification system
SCS4 fourth stillage clarification system
SD1 first separation device
SD2 second separation device
SD3 third separation device
SS1 steam source
UF1 first separation device underflow
UF2 second separation device underflow
UF3 third separation device underflow
VP1 vapors
WD1 water dilution
WSF1 whole stillage flow The present disclosure is not to be limited to the particular embodiments described herein. The following claims set forth a number of the embodiments of the present disclosure with greater particularity.

What is claimed is:

1. A stillage clarification process comprising the step of:
splitting whole stillage into a plurality of fractions, said fractions comprising:
a) a first fraction enriched with insoluble protein, said first fraction having a yield of 0.8-3.5 pounds per bushel on a dry matter basis, and comprising 45% to 70% protein, and 3% to 8% fat, each on a dry matter basis;
b) a second fraction comprising distillers corn oil with a yield of at least 1.0 pounds per bushel on a dry matter basis;
c) a third fraction enriched with fiber, said third fraction having a yield of 7-10 pounds per bushel on a dry matter basis, and comprising 13% to 17% fiber, 22% to 28% protein, and less than 8% fat, each on a dry matter basis; and
d) a fourth fraction enriched with soluble protein, said fourth fraction having a yield of 4.4-4.8 pounds per bushel on a dry matter basis, comprising at least 30% soluble protein and not more than 3% fat, each on a dry matter basis;
wherein said step of splitting said whole stillage comprises (i) first separating at least one of said whole stillage and a portion of said whole stillage by at least one of a static density separation process and a static settling velocity separation process, and (ii) then separating a portion of said whole stillage by a mechanical separation process.

2. The stillage clarification process of claim 1, wherein said second fraction is split by evaporation and oil separation to form said fourth fraction having a final dry matter concentration between 50% to 80%.

3. The stillage clarification process of claim 1, wherein said step of splitting said whole stillage further comprises an evaporative process performed at or below about 215° F. on one of the group consisting of said second fraction, said fourth fraction, and combinations thereof.

4. A stillage clarification system comprising:
a hydrocyclone;
a disk centrifuge; and
a decanter centrifuge;
wherein said hydrocyclone is configured to receive whole stillage, said whole stillage is a by-product from the production of grain ethanol,
wherein said disk centrifuge is configured to receive an overflow from said hydrocyclone,
wherein said decanter centrifuge is configured to receive an underflow from said hydrocyclone, and
wherein said stillage clarification system is configured to split said whole stillage into a plurality of fractions, said fractions comprising:
a) a first fraction enriched with insoluble protein, said first fraction having a yield of 0.8-3.5 pounds per bushel on a dry matter basis, and comprising 45% to 70% protein and 3% to 8% fat, each on a dry matter basis;
b) a second fraction comprising distillers corn oil with a yield of at least 1.0 pounds per bushel on a dry matter basis;
c) a third fraction enriched with fiber, said third fraction having a yield of 7-10 pounds per bushel on a dry matter basis, and comprising 22% to 28% protein and less than 8% fat, each on a dry matter basis; and
d) a fourth fraction enriched with soluble protein, said fourth fraction having a yield of 4.4-4.8 pounds per bushel on a dry matter basis, and comprising at least 30% soluble protein and not more than 3% fat, each on a dry matter basis.

5. The stillage clarification system of claim 4, further comprising an evaporator, wherein said evaporator is configured to receive at least one component from an underflow of said hydrocyclone.

6. The stillage clarification system of claim 4, further comprising an evaporator, wherein said evaporator is configured to receive at least one component from a solid stream from said disk centrifuge.

7. The stillage clarification system of claim 6, wherein said evaporator is configured to remove said at least one component from said solid stream to enhance removal of oil and ash and increase protein purity.

8. The stillage clarification system of claim 4, wherein said disk centrifuge is further configured to receive at least one of a surfactant and a demulsifying chemical.

9. The stillage clarification system of claim 8, wherein said surfactant and said demulsifying chemical enhances removal of oil and ash and increases protein purity.

* * * * *